United States Patent
Kwak et al.

(10) Patent No.: US 10,587,390 B2
(45) Date of Patent: Mar. 10, 2020

(54) METHOD FOR TRANSMITTING AND RECEIVING REFERENCE SIGNAL AND APPARATUS THEREFOR

(71) Applicant: LG Electronics Inc., Seoul (KR)

(72) Inventors: Kyuhwan Kwak, Seoul (KR); Seungmin Lee, Seoul (KR); Yunjung Yi, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/397,671

(22) Filed: Apr. 29, 2019

(65) Prior Publication Data

US 2019/0334688 A1    Oct. 31, 2019

Related U.S. Application Data

(60) Provisional application No. 62/670,066, filed on May 11, 2018, provisional application No. 62/663,294, filed on Apr. 27, 2018.

(51) Int. Cl.
*H04L 5/00* (2006.01)
*H04W 72/04* (2009.01)
*H04W 88/08* (2009.01)

(52) U.S. Cl.
CPC .......... *H04L 5/0082* (2013.01); *H04L 5/0051* (2013.01); *H04W 72/042* (2013.01); *H04W 72/0446* (2013.01); *H04W 88/08* (2013.01)

(58) Field of Classification Search
CPC .. H04L 5/0082; H04L 5/0051; H04W 72/042; H04W 72/0446; H04W 88/08
See application file for complete search history.

(56) References Cited

U.S. PATENT DOCUMENTS 10,277,367 B2 *  4/2019  Nory .................. H04L 5/14
10,356,778 B2 *  7/2019  Tseng
(Continued)

FOREIGN PATENT DOCUMENTS

KR    1020170074851     6/2017
KR    1020170128141    11/2017
(Continued)

OTHER PUBLICATIONS

Ericsson, "RAN1 decisions for WI Shortened TTI and processing time for LTE (LTE_sTTIandPT)," R1-1803173, 3GPP TSG RAN WG1 Meeting #92, Athens, Greece, Feb. 26-Mar. 2, 2018, 57 pages.
(Continued)

*Primary Examiner* — Chi H Pham
*Assistant Examiner* — Weibin Huang
(74) *Attorney, Agent, or Firm* — Fish & Richardson P.C.

(57) ABSTRACT

A method of receiving, by a user equipment (UE), a reference signal in a wireless communication system. The method includes: receiving downlink control information (DCI) for scheduling downlink data in a first transmission time interval (TTI); acquiring, from the DCI, information related to whether the reference signal is included in the first TTI in which the downlink data is scheduled; and receiving, in the first TTI, the reference signal for the first TTI based on the information related to whether the reference signal is included in the first TTI. The method further includes, based on the downlink data scheduled to be repeatedly transmitted in the first TTI and at least one second TTI: receiving, in each of the at least one second TTI, a reference signal for the each of the at least one second TTI.

17 Claims, 17 Drawing Sheets

(56) References Cited

U.S. PATENT DOCUMENTS

| | | | |
|---|---|---|---|
| 2016/0309466 A1* | 10/2016 | Chen | H04B 7/2628 |
| 2017/0171879 A1* | 6/2017 | Jiang | H04L 1/1607 |
| 2018/0309489 A1* | 10/2018 | Hosseini | H04B 7/0626 |
| 2018/0324771 A1* | 11/2018 | Hosseini | H04W 72/042 |
| 2019/0116583 A1* | 4/2019 | Sahlin | H04L 5/0048 |
| 2019/0260447 A1* | 8/2019 | Nam | H04B 7/0626 |

FOREIGN PATENT DOCUMENTS

| | | |
|---|---|---|
| WO | WO2016200236 | 12/2016 |
| WO | WO2017014560 | 1/2017 |
| WO | WO2017078786 | 5/2017 |
| WO | WO2017100556 | 6/2017 |
| WO | WO2017172447 | 10/2017 |
| WO | WO2018018776 | 2/2018 |
| WO | WO2018059305 | 4/2018 |

OTHER PUBLICATIONS

LG Electronics, Ericsson, Nokia, Nokia Shanghai Bell, Intel Corporation, "Corrections related to DL data channel for sTTI operation," R1-1805399, 3GPP TSG RAN WG1 Meeting #92bis, Sanya, P.R. China, Apr. 16-20, 2018, 4 pages.

Ericsson, "RAN1 decisions for WI Shortened TTI and processing time for LTE (LTE_sTTIandPT)—per topic," R1-1803174, 3GPP TSG RAN WG1 Meeting #92, Athens, Greece, Feb. 26-Mar. 2, 2018, 43 pages.

Huawei, HiSilicon, "Blind/HARQ-less Repetition for Scheduled DL-SCH Operation," R1-1805322, 3GPP TSG RAN WG1 Meeting #92bis, Sanya, China, Apr. 16-20, 2018, 9 pages.

Huawei, HiSilicon, "Summary of simulation results regarding HARQ-less repetition for scheduled DL-SCH," R1-1805342, 3GPP TSG RAN WG1 Meeting #92bis, Sanya, China, Apr. 16-20, 2018, 6 pages.

Nokia, Nokia Shanghai Bell, "On blind/HARQ-less PDSCH repetition," R1-1804587, 3GPP TSG-RAN WG1 Meeting #92bis, Sanya, P.R. China, dated Apr. 16-20, 2018, 6 pages.

Ericsson, "Text proposal on 1ms HARQ bits inclusion in UL sTTI in case of SPS and HARQ process sharing," R1-1805354, 3GPP TSG-RAN WG1 Meeting #92bis, Sanya, P.R. China, dated Apr. 16-20, 2018, 3 pages.

Taiwan Notice of Allowance in Taiwan Application No. 108114956, dated Nov. 28, 2019, 5 pages (with English translation).

* cited by examiner

CONTROL-PLANE PROTOCOL STACK

USER-PLANE PROTOCOL STACK

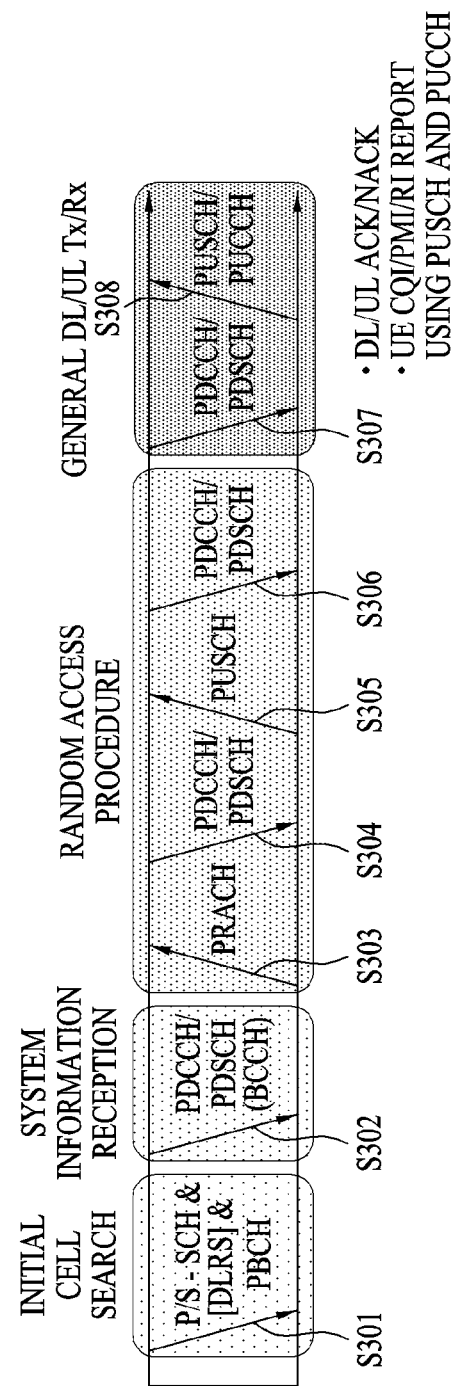

1 TX or 2 TX

4 TX

METHOD FOR TRANSMITTING AND RECEIVING REFERENCE SIGNAL AND APPARATUS THEREFOR

CROSS-REFERENCE TO RELATED APPLICATIONS

This application claims the benefit of an earlier filing date and right of priority to U.S. Provisional Application No. 62/663,294, filed on Apr. 27, 2018, and U.S. Provisional Application No. 62/670,066, filed on May 11, 2018. The disclosures of the prior applications are incorporated by reference in their entirety.

TECHNICAL FIELD

The present disclosure generally relates to transmitting and receiving a reference signal in a wireless communication system.

BACKGROUND

With increasing demands and expectation of users and service providers of wireless communication systems, new radio access technologies are under development to provide improvements such as cost reduction per bit, increased service availability, flexible use of frequency bands, simplified structure, an open interface, and appropriate power consumption of UEs.

SUMMARY

One general aspect of this disclosure includes a method of receiving, by a user equipment (UE), a reference signal in a wireless communication system, the method including: receiving downlink control information (DCI) for scheduling downlink data in a first transmission time interval (TTI). The method also includes acquiring, from the DCI, information related to whether the reference signal is included in the first TTI in which the downlink data is scheduled. The method also includes receiving, in the first TTI, the reference signal for the first TTI based on the information related to whether the reference signal is included in the first TTI; and based on the downlink data scheduled to be repeatedly transmitted in the first TTI and at least one second TTI: receiving, in each of the at least one second TTI, a reference signal for the each of the at least one second TTI. Other embodiments of this aspect include corresponding computer systems, apparatus, and computer programs recorded on one or more computer storage devices, each configured to perform the actions of the methods.

Implementations may include one or more of the following features. The method where the information related to whether the reference signal is included in the first TTI includes a fixed value. The method where the fixed value in the information related to whether the reference signal is included in the first TTI is used to inform that the reference signal for the first TTI is included in the first TTI. The method further including: acquiring, from the DCI, information regarding a number of times that the downlink data is scheduled to be repeatedly transmitted in the first TTI and the at least one second TTI. The method where based on the downlink data scheduled to be repeatedly transmitted in the first TTI and in the at least one second TTI: the number of times that the downlink data is scheduled to be repeatedly transmitted is greater than 1. The method where the first TTI and the at least one second TTI are short TTIs. The method where the at least one second TTI includes a plurality of second TTIs that are consecutively arranged in time with the first TTI. Implementations of the described techniques may include hardware, a method or process, or computer software on a computer-accessible medium.

Another general aspect includes an apparatus configured to receive a reference signal in a wireless communication system, the apparatus including: at least one processor; and at least one computer memory operably connectable to the at least one processor and storing instructions that, when executed by the at least one processor, perform operations including: receiving downlink control information (DCI) for scheduling downlink data in a first transmission time interval (TTI). The apparatus where the operations also include acquiring, from the DCI, information related to whether the reference signal is included in the first TTI in which the downlink data is scheduled. The apparatus where the operations also include receiving, in the first TTI, the reference signal for the first TTI, based on the information related to whether the reference signal is included in the first TTI; and based on the downlink data scheduled to be repeatedly transmitted in the first TTI and at least one second TTI: receiving, in each of the at least one second TTI, a reference signal for the each of the at least one second TTI. Other embodiments of this aspect include corresponding computer systems, apparatus, and computer programs recorded on one or more computer storage devices, each configured to perform the actions of the methods.

Implementations may include one or more of the following features. The apparatus where the information related to whether the reference signal is included in the first TTI includes a fixed value. The apparatus where the fixed value in the information related to whether the reference signal is included in the first TTI is used to inform that the reference signal for the first TTI is included in the first TTI. The apparatus where the operations further include: acquiring, from the DCI, information regarding a number of times that the downlink data is scheduled to be repeatedly transmitted in the first TTI and the at least one second TTI. The apparatus where the number of times that the downlink data is scheduled to be repeatedly transmitted in the first TTI and the at least one second TTI is greater than 1. The apparatus where the first TTI and the at least one second TTI are short TTIs. The apparatus where the at least one second TTI includes a plurality of second TTIs that are consecutively arranged in time with the first TTI. Implementations of the described techniques may include hardware, a method or process, or computer software on a computer-accessible medium.

Another general aspect includes a method of transmitting, by a base station, a reference signal in a wireless communication system, the method including: transmitting downlink control information (DCI) for scheduling downlink data in a first transmission time interval (TTI), the DCI including information related to whether the reference signal is included in the first TTI in which the downlink data is scheduled. The method also includes transmitting, in the first TTI, the reference signal for the first TTI based on the information related to whether the reference signal is included in the first TTI; and based on the downlink data scheduled to be repeatedly transmitted in the first TTI and at least one second TTI: transmitting, in each of the at least one second TTI, a reference signal for the each of the at least one second TTI. Other embodiments of this aspect include corresponding computer systems, apparatus, and computer programs recorded on one or more computer storage devices, each configured to perform the actions of the methods.

Another general aspect includes a user equipment (UE) configured to receive a reference signal in a wireless communication system, the UE including: at least one transceiver. The user equipment also includes at least one processor; and at least one computer memory operably connectable to the at least one processor and storing instructions that, when executed by the at least one processor, perform operations including: receiving, through the at least one transceiver, downlink control information (DCI) for scheduling downlink data in a first transmission time interval (TTI). The user equipment where the operations also include acquiring, from the DCI, information related to whether the reference signal is included in the first TTI in which the downlink data is scheduled. The user equipment where the operations also include receiving, in the first TTI through the at least one transceiver, the reference signal for the first TTI, based on the information related to whether the reference signal is included in the first TTI; and based on the downlink data scheduled to be repeatedly transmitted in the first TTI and at least one second TTI: receiving, in each of the at least one second TTI through the at least one transceiver, a reference signal for the each of the at least one second TTI Other embodiments of this aspect include corresponding computer systems, apparatus, and computer programs recorded on one or more computer storage devices, each configured to perform the actions of the methods.

Another general aspect includes a base station (BS) configured to transmit a reference signal in a wireless communication system, the BS including: at least one transceiver. The base station also includes at least one processor; and at least one computer memory operably connectable to the at least one processor and storing instructions that, when executed by the at least one processor, perform operations including: transmitting, through the at least one transceiver, downlink control information (DCI) for scheduling downlink data in a first transmission time interval (TTI), the DCI including information related to whether the reference signal is included in the first TTI in which the downlink data is scheduled. The base station where the operations also include transmitting, in the first TTI through the at least one transceiver, the reference signal for the first TTI based on the information related to whether the reference signal is included in the first TTI; and based on the downlink data scheduled to be repeatedly transmitted in the first TTI and at least one second TTI: transmitting, in each of the at least one second TTI through the at least one transceiver, a reference signal for the each of the at least one second TTI.

Other embodiments of this aspect include corresponding computer systems, apparatus, and computer programs recorded on one or more computer storage devices, each configured to perform the actions of the methods.

It is to be understood that both the foregoing general description and the following detailed description of the present disclosure are exemplary and explanatory and are intended to provide further explanation of the disclosure as claimed.

BRIEF DESCRIPTION OF THE DRAWINGS

FIG. 3 illustrates examples of physical channels and signal transmission using the physical channels in a 3GPP system;

DETAILED DESCRIPTION

Implementations are disclosed herein that enable transmitting and receiving a reference signal, and in particular, sharing a reference signal (RS) among a plurality of transmission time intervals (TTI) in which data is repeatedly transmitted.

As used herein, the phrase "sharing an RS" refers to reusing a channel estimation value (measured based on an RS transmitted in a previous TTI or a following TTI) to either demodulate data or obtain information about a channel state. In scenarios where variations of the channel state are expected to be relatively slowly-varying, an estimated value measured from an RS transmitted in another TTI (preceding or following the corresponding TTI) may be applied in the corresponding TTI to demodulate data or to obtain information about the channel state. Thereby, resource elements that would otherwise be utilized for mapping the RS may instead be used in mapping data, which may help improve data throughput.

In some implementations, RS sharing may not be applied, even though data is scheduled to be repeatedly transmitted through multiple TTIs. In such scenarios in which RS-sharing is not applied, the RS may be configured to be received in all TTIs in which the data is repeatedly transmitted. Not applying RS-sharing (i.e., transmitting an RS in all TTIs in which data is repeatedly transmitted) may, in some scenarios, help increase reliability of data transmission. In particular, by transmitting an RS in all TTIs in which data is repeatedly transmitted, relatively improved reliability may be achieved, as compared to RS-sharing scenarios in which an RS is transmitted in fewer than all TTIs (e.g., only in one TTI) and the same channel estimation values are reused in the other TTIs.

Figure 1:
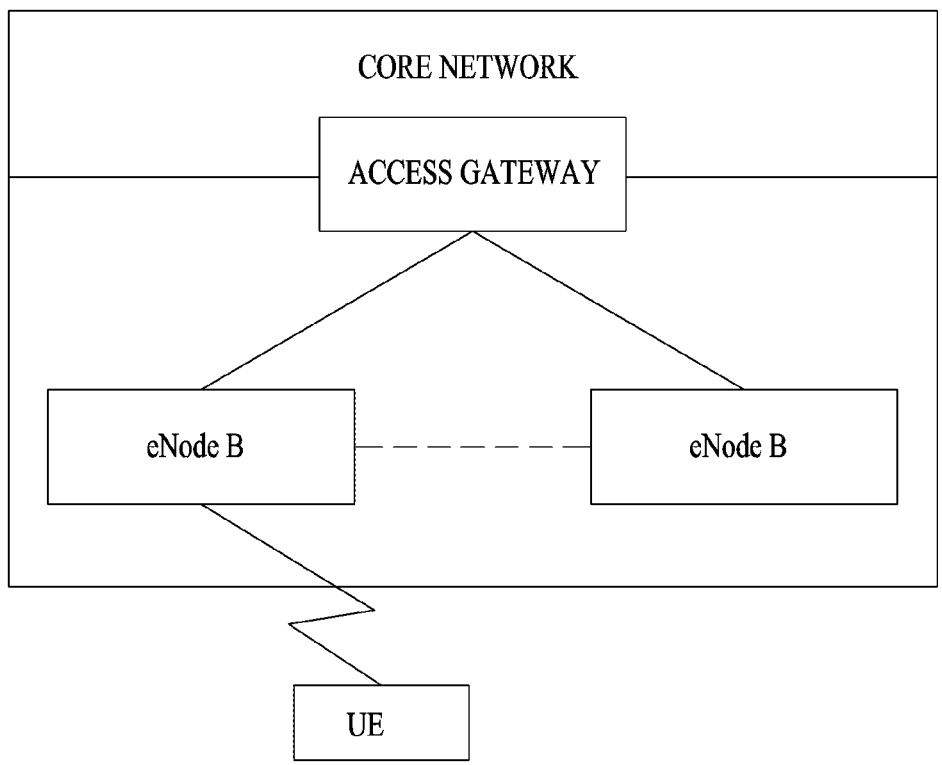
FIG. 1 illustrates an example of a wireless communication system.

FIG. 1 illustrates an example of a wireless communication system. In some scenarios, the system of FIG. 1 may be implemented to be compatible with 3rd Generation Partnership Project Long Term Evolution (3GPP LTE) systems, such as an Evolved Universal Mobile Telecommunications System (E-UMTS) network. The E-UMTS is an evolution of UMTS and the 3GPP is working on the basics of E-UMTS standardization. An E-UMTS is also referred to an LTE system.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc., by transmitting DL scheduling information to the UE. Regarding UL data, the eNB notifies a particular UE of a time-frequency area in which the UE can transmit data, a coding scheme, a data size, HARQ information, etc., by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc., are required.

Reference will now be made in detail to the preferred implementations of the present disclosure, examples of which are illustrated in the accompanying drawings. Wherever possible, the same reference numbers will be used throughout the drawings to refer to the same or like parts.

The configuration, operation, and other features of the present disclosure will readily be understood with implementations of the present disclosure described with reference to the attached drawings. Implementations of the present disclosure as set forth herein are examples in which the technical features of the present disclosure are applied to a 3rd Generation Partnership Project (3GPP) system.

While implementations of the present disclosure are described in the context of Long Term Evolution (LTE) and LTE-Advanced (LTE-A) systems, they are purely exemplary. Therefore, the implementations of the present disclosure are applicable to any other communication system as long as the above definitions are valid for the communication system. In addition, while the implementations of the present disclosure are described in the context of Frequency Division Duplexing (FDD), they are also readily applicable to Half-FDD (H-FDD) or Time Division Duplexing (TDD) with some modifications.

Figure 2A:
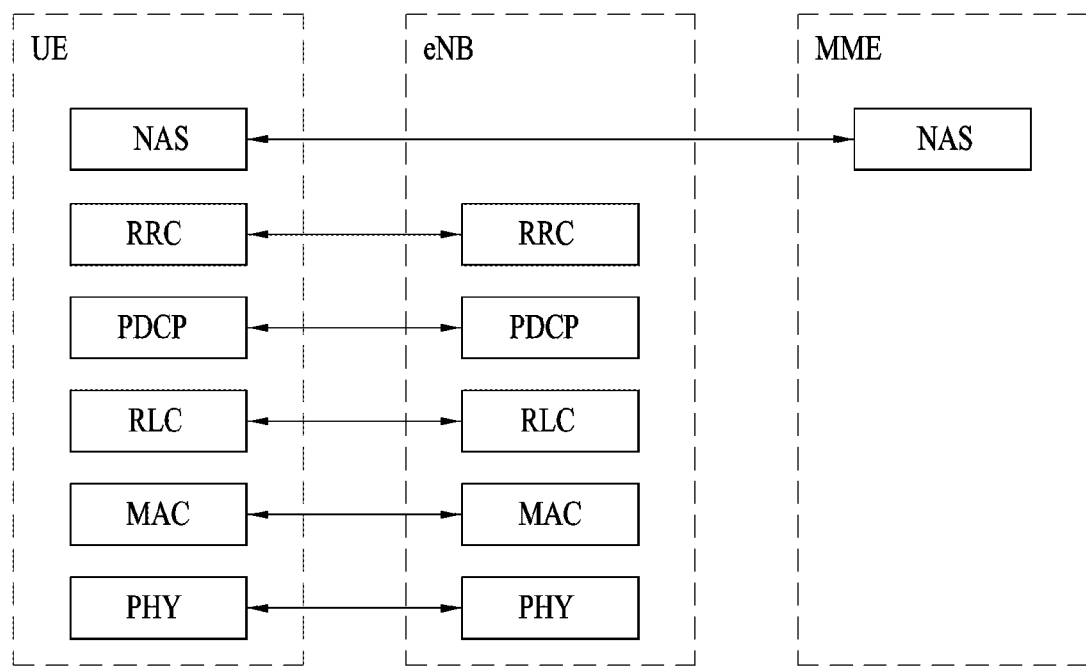
FIGS. 2A and 2B illustrate examples of a control-plane protocol stack and a user-plane protocol stack in a radio interface protocol architecture.
Figure 2B:
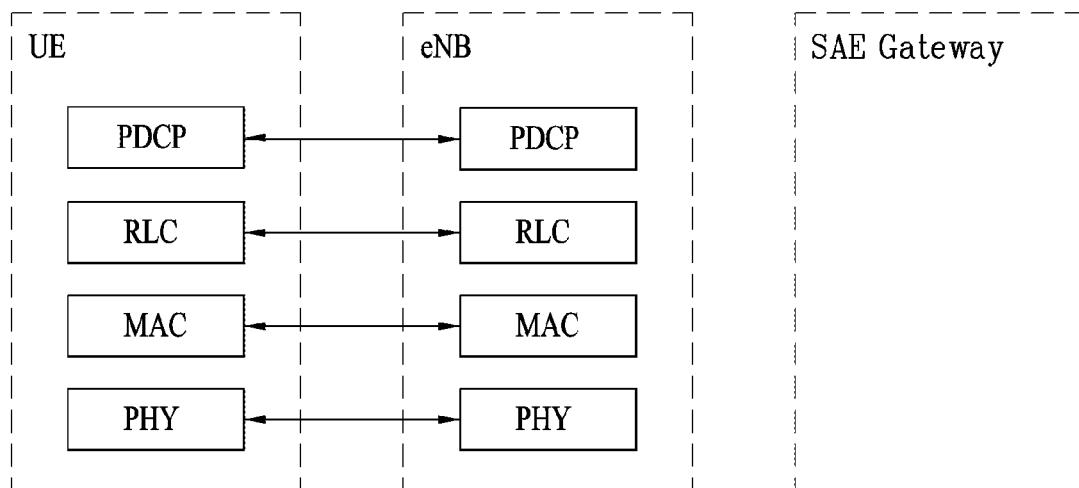

FIGS. 2A and 2B illustrate examples of control-plane and user-plane protocol stacks in a radio interface protocol architecture. In some scenarios, the examples of FIGS. 2A and 2B may be compatible with a 3GPP wireless access network standard between a User Equipment (UE) and an Evolved UMTS Terrestrial Radio Access Network (E-UTRAN). For example, the control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

FIG. 3 illustrates examples of physical channels and transmitting signals on the physical channels in a 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
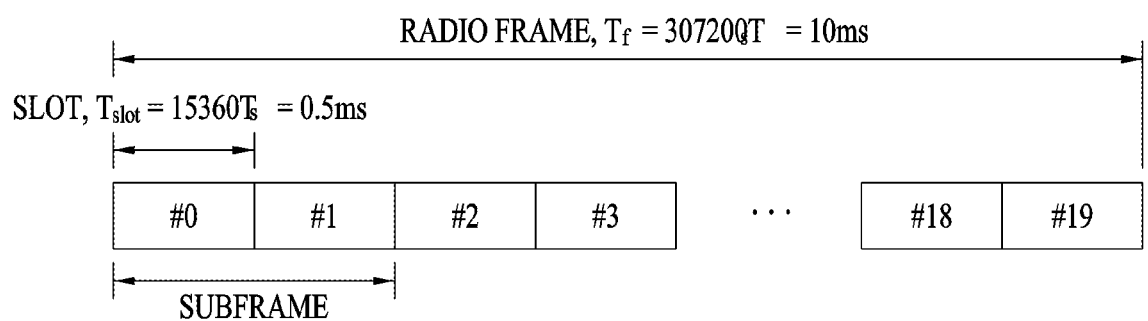
FIG. 4 illustrates an example of a structure of a radio frame.

FIG. 4 illustrates an example of a structure of a radio frame. In some scenarios, such implementations may be compatible with an LTE system.

Referring to FIG. 4, a radio frame is 10 ms (327200x$T_s$) long and divided into 10 equal-sized subframes. Each subframe is 1 ms long and further divided into two slots. Each time slot is 0.5 ms (15360x$T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is merely exemplary and thus the number of subframes in a radio frame, the number of slots in a subframe, or the number of OFDM symbols in a slot may vary.

Figure 5:
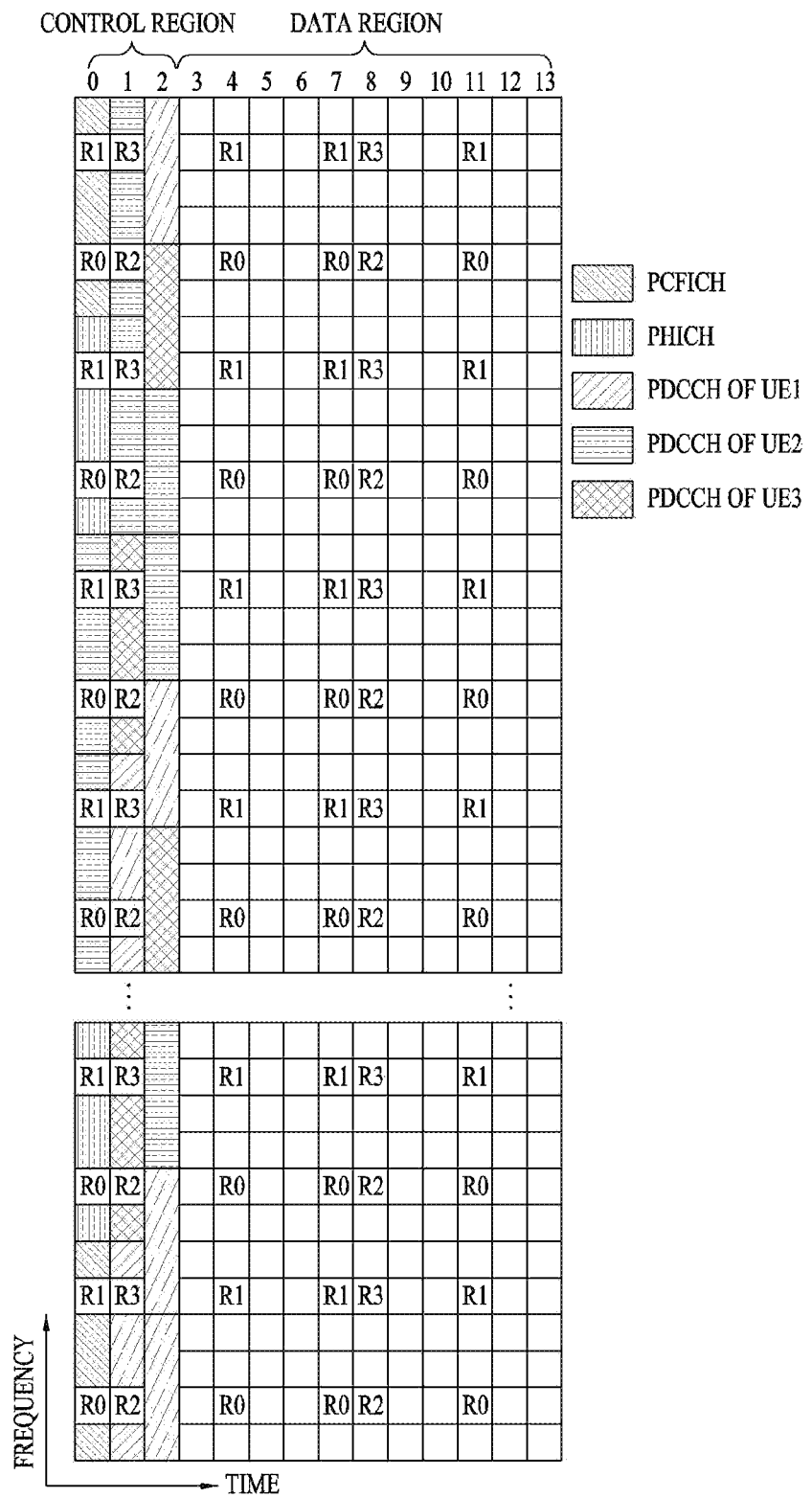
FIG. 5 illustrates an example of a structure of a downlink radio frame.

FIG. 5 illustrates examples of control channels included in a control region of a subframe in a DL radio frame. In some scenarios, such implementations may be compatible with an LTE system.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is an integer greater than or equal to 1, and is indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, in scenarios where the Cyclic Redundancy Check (CRC) of a specific PDCCH is masked by Radio Network Temporary Identity (RNTI) "A" and information about data transmitted in radio resources (e.g., at a frequency position) "B" based on transport format information (e.g., a transport block size, a modulation scheme, coding information, etc.) "C" is transmitted in a specific subframe, a UE within a cell monitors, e.g., blind-decodes, a PDCCH using its RNTI information in a search space. If one or more UEs have RNTI "A", then those UEs receive the PDCCH and receive a PDSCH indicated by "B" and "C" based on information of the received PDCCH.

Figure 6A:
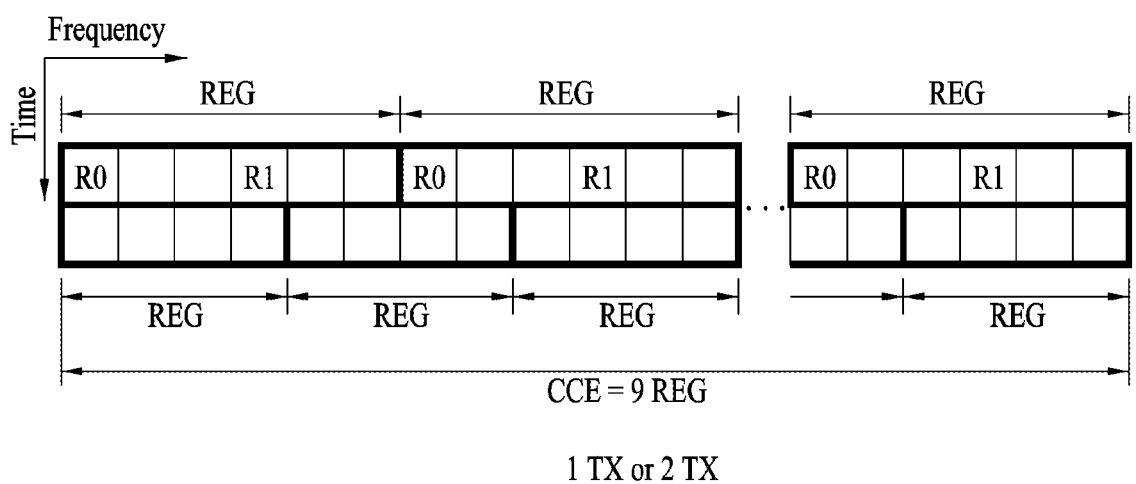
FIGS. 6A and 6B illustrate an example of resource units used to configure a downlink control channel.
Figure 6B:
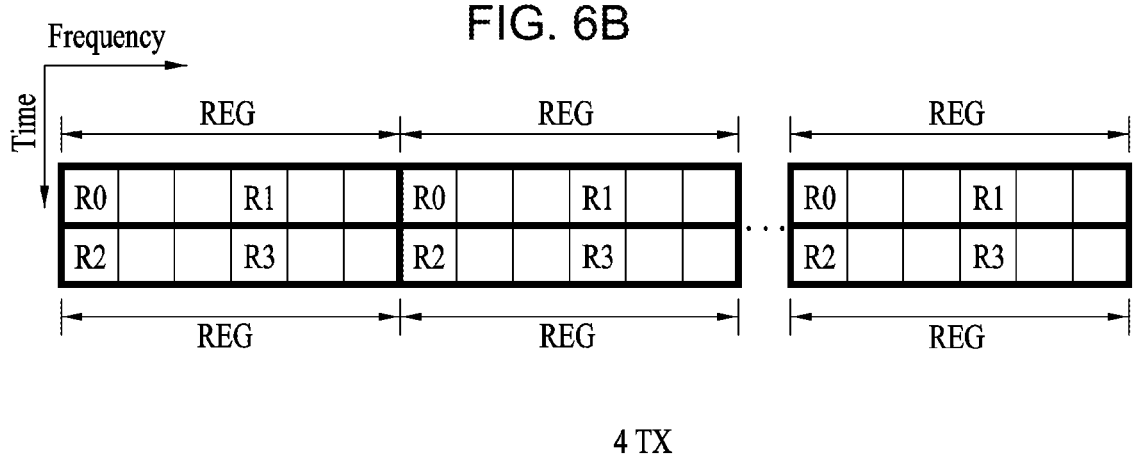

FIGS. 6A and 6B illustrate examples of resource units used to configure a downlink control channel. In some scenarios, such implementations may be compatible with an LTE system.

FIG. 6A shows a case in which the number of transmit (Tx) antennas is 1 or 2 and FIG. 6B shows a case in which the number of Tx antenna is 4. Although a different RS pattern is used according to the number of Tx antennas, REs are configured for a DL control channel in the same manner.

Referring to FIGS. 6A and 6B, a basic resource unit of a DL control channel is an REG. The REG includes four contiguous REs except for REs carrying RSs. REGs are delineated with bold lines in FIGS. 6A and 6B. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor $M^{(L)}$ ($\geq L$) CCEs that are arranged contiguously or according to a predetermined rule. The value of L that the UE should consider for PDCCH reception may be a plural value. The CCE sets that the UE should monitor to receive a PDCCH are referred to as a search space. As an example, a system that is compatible with LTE may define search spaces as illustrated in Table 1, below.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In the example of Table 1, the parameter L is a CCE aggregation level, that is, the number of CCEs in a PDCCH, the parameter $S_k^{(L)}$ is a search space with CCE aggregation level L, and the parameter $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 7:
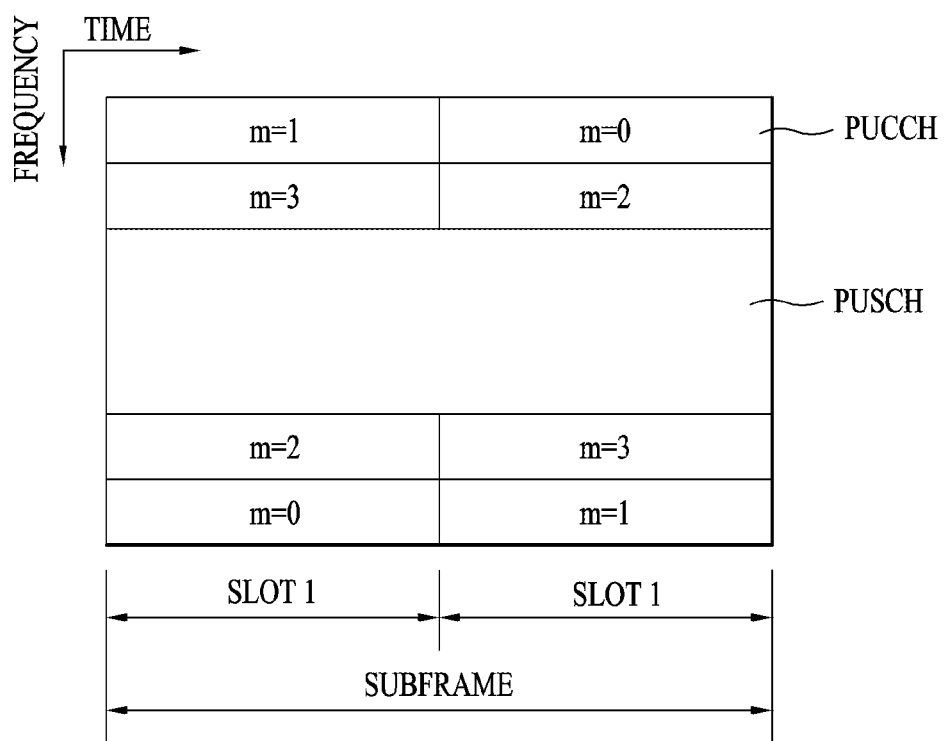
FIG. 7 illustrates an example of a structure of an uplink subframe.

FIG. 7 illustrates an example of a structure of a UL subframe. In some scenarios, such implementations may be compatible with an LTE system.

Referring to FIG. 7, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in the example of FIG. 7.

Reference Signal (RS)

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both of a transmitting end and the receiving end is transmitted and finds out the channel information with the extent of distortion when the signal is received on a channel. The signal is called a pilot signal or a reference signal.

When a data is transmitted/received using MIMO antenna, it may be preferable that a channel state between a transmitting antenna and a receiving antenna is detected in order for a receiving end to correctly receive the data. Hence, in order for the receiving end to detect the channel state, each transmitting antenna of the transmitting end may preferably have an individual reference signal.

In a wireless communication system, RSs may be broadly divided into two types according to the purposes thereof. One type of RS is used to acquire channel information and the other type of RS is used for data demodulation. The former RS is used to allow the UE to acquire DL channel information, and this RS should be transmitted over a wide band. In some implementations, even UEs which do not receive DL data in a specific subframe may receive and measure the RS. In some scenarios, the former RS is also used for measurement of, for example, handover. The latter RS is sent when an eNB sends a resource on downlink. The UE may perform channel measurement by receiving this latter RS, thereby implementing data modulation. This RS should be transmitted in a region in which data is transmitted.

In some implementations, such as those compatible with 3GPP LTE systems (e.g., 3GPP LTE Release-8), two types of downlink RSs may be implemented for unicast service. One is a common RS (CRS), and the other is a dedicated RS (DRS). The CRS is used for acquisition of information about the channel state and measurement of, for example, handover, and may be referred to as a cell-specific RS. The DRS is used for data demodulation, and may be referred to as a UE-specific RS. In such systems, the DRS may be used only for data demodulation, and the CRS may be used for both acquisition of channel information and data demodulation.

The CRS is transmitted cell-specifically in every subframe in a wideband. The CRS may be transmitted with respect to up to four antenna ports depending on the number of Tx antennas of the eNB. For example, if the number of Tx antennas of the eNB is 2, CRSs for antenna ports #0 and #1 are transmitted. If the number of Tx antennas of the eNB is 4, CRSs for antenna ports #0 to #3 are respectively transmitted.

Figure 8:
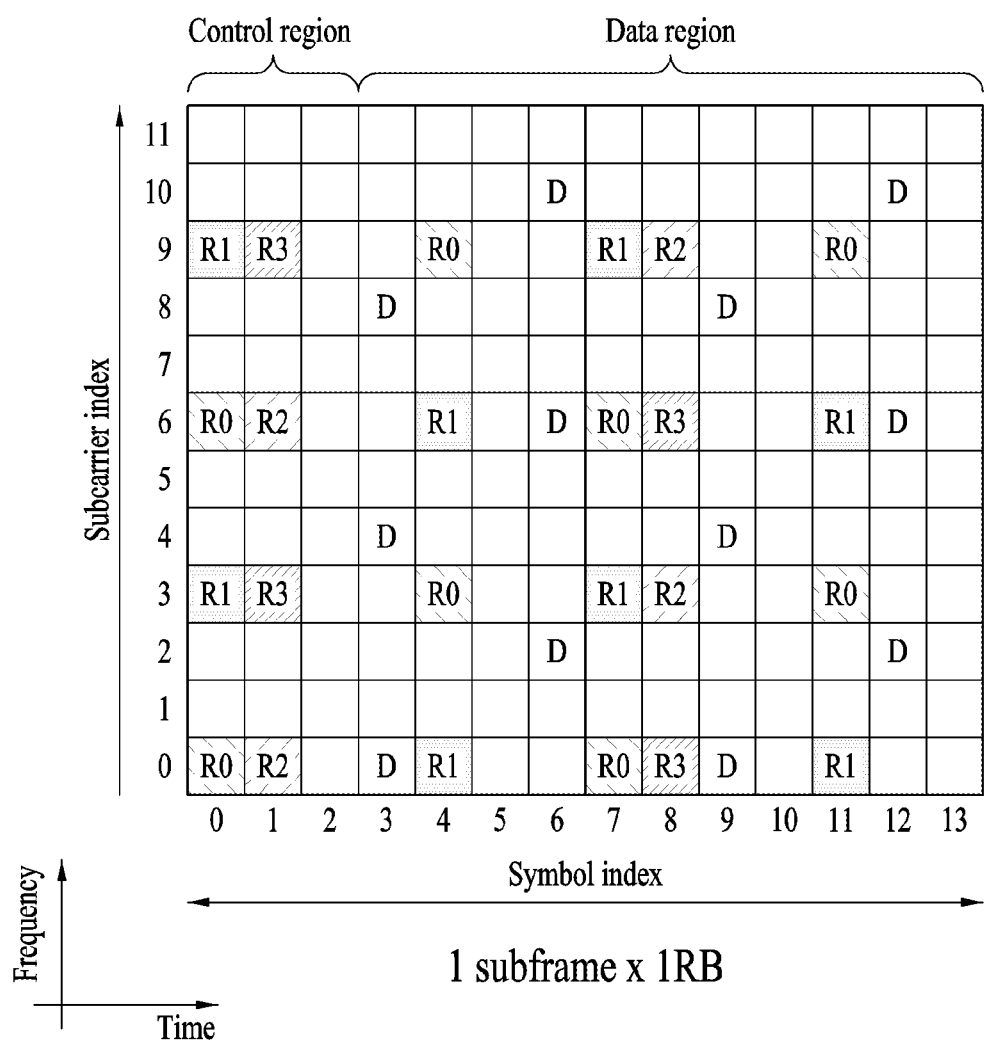
FIG. 8 is a diagram illustrating an example of a pattern of a CRS and a DRS on one RB pair.

FIG. 8 is a diagram of an example of a pattern of CRS and DRS on a resource block (RB) pair.

As an example of reference signal pattern, FIGS. 6A and 6B show a pattern of CRS and DRS on a RB pair (normal CP case, 14 OFDM symbol in time domain×12 subcarriers in frequency domain) in a system supporting 4 antennas by a base station. In FIG. 8, resource elements (RE) represented as 'R0', 'R1', 'R2', and 'R3' indicate positions of the CRS for an antenna port 0, 1, 2, and 3, respectively. Meanwhile, resource elements represented as 'D' in FIG. 8 indicate positions of the DRS.

In some systems, such as those compatible with LTE-A (an advanced version of LTE), up to 8 Tx antennas on downlink may be supported. In such systems, RSs for up to 8 Tx antennas may be supported. By contrast, in some systems, such as those compatible with LTE, downlink RSs may be defined only for up to 4 antenna ports. Therefore, in scenarios where an eNB of a system that is compatible with LTE-A implements 4 to 8 DL Tx antennas, RSs for these antenna ports may need to be additionally defined. Among these RSs for up to 8 Tx antenna ports, both the RS for channel measurement and the RS for data demodulation may need be considered.

One important consideration in designing systems that are compatible with LTE-A is backward compatibility. Backward compatibility refers to supporting an LTE-compatible UE, such that the LTE-compatible UE is also compatible with LTE-A systems. In terms of RS transmission, if RSs for up to 8 Tx antennas are added to a time-frequency region in which a CRS compatible with LTE is transmitted in every subframe over the full band, then RS overhead may increase excessively. Accordingly, in designing new RSs for up to 8 antenna ports, reduction in RS overhead needs to be considered.

In some systems, such as those that are compatible with LTE-A, the additional RSs may be classified into two types. One type of RS is a channel state information-RS (CSI-RS) intended for channel measurement for selecting a transmission rank, a modulation and coding scheme (MCS), a precoding matrix index (PMI), and the like. The other types of RS is a demodulation RS (DMRS) intended for demodulation of data transmitted through up to 8 Tx antennas.

In some implementations, the CSI-RS is designed for channel measurement, unlike the CRS that may be implemented in some systems, which is used for data demodulation, in addition to channel measurement and handover measurement. In some scenarios, the CSI-RS may also be used for handover measurement. In some implementations, the CSI-RS is transmitted only in order to obtain information about channel states, and the CSI-RS need not be transmitted in every subframe, unlike the CRS in systems that are compatible with LTE. Accordingly, in some implementations, to reduce overhead of the CSI-RS, the CSI-RS may be designed to be intermittently (e.g., periodically) transmitted in the time domain.

When data is transmitted in a certain DL subframe, a dedicated DMRS is transmitted to a UE for which data transmission is scheduled. In some scenarios, the DMRS may be referred to as a UE-specific RS. A DMRS dedicated to a specific UE may be designed to be transmitted only in a resource region in which the UE is scheduled, i.e., the time-frequency region in which data for the UE is transmitted.

Figure 9:
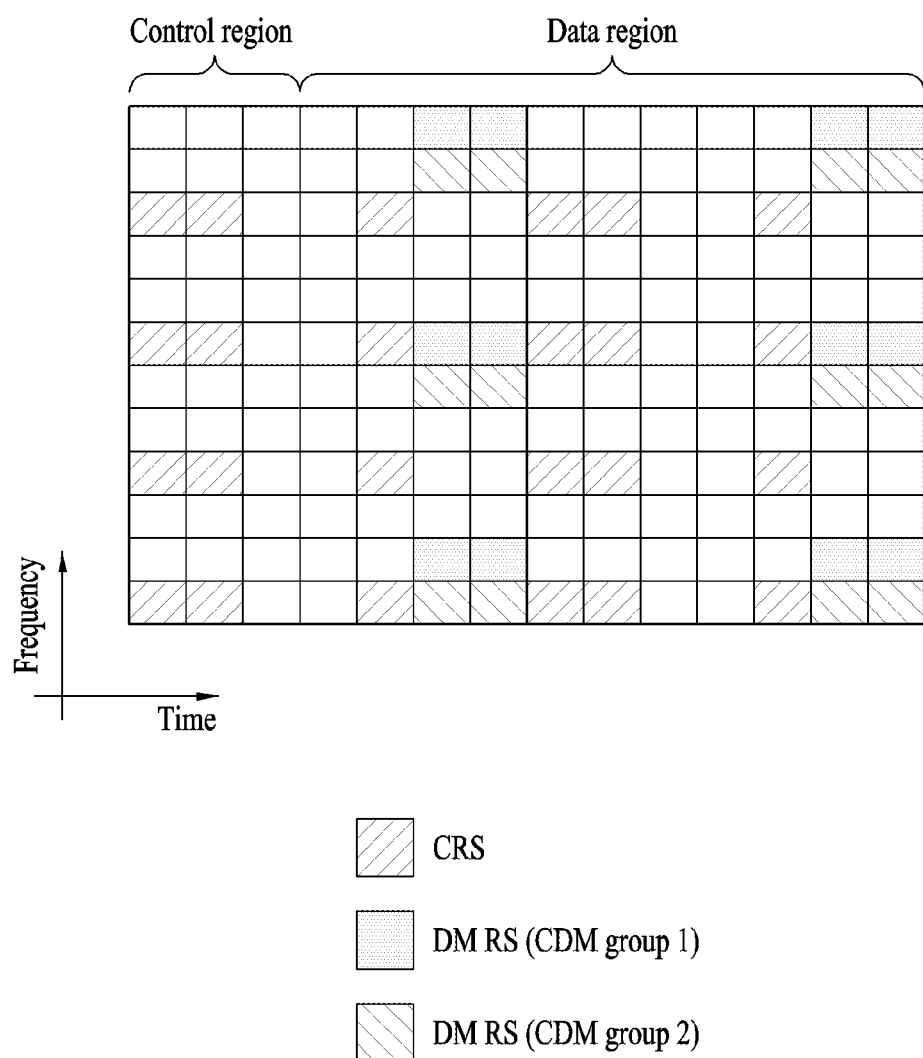
FIG. 9 is a diagram illustrating an example of a DMRS pattern.

FIG. 9 is a diagram illustrating an example of a DMRS pattern. In some scenarios, such implementations may be compatible with an LTE-A system.

The example in FIG. 9 shows a position of a resource element to which a DMRS is transmitted on one resource block pair (in case of a normal CP, 14 OFDM symbols in time domain×12 subcarriers in frequency domain) in which DL data is transmitted. The DMRS may be transmitted in response to 8 antenna ports (antenna port index 7, 8, 9, 10), compatible with LTE-A systems. The DMRS for antenna ports different from each other may be distinguished from each other in a manner of being positioned at frequency resources (subcarriers) different from each other and/or time resources (OFDM symbols) different from each other (i.e., the DMRS for antenna ports different from each other may be multiplexed by FDM and/or TDM). And, the DMRS for antenna ports different from each other positioned at an identical time-frequency resource may be distinguished from each other by an orthogonal code (i.e., the DMRS for antenna ports different from each other may be multiplexed by CDM). In the example of FIG. 9, DMRSs for antenna ports 7 and 8 may be positioned on the REs indicated by DMRS CDM Group 1 and be multiplexed by an orthogonal code. Similarly, in the example of FIG. 9, DMRSs for antenna ports 9 and 10 may be positioned on the REs indicated by DMRS Group 2 and be multiplexed by the orthogonal code.

When the eNB transmits a DMRS, precoding applied to data is applied to the DMRS. Accordingly, the channel information estimated by the UE using the DMRS (or UE-specific RS) is precoded channel information. The UE may easily perform data demodulation using the precoded channel information estimated through the DMRS. However, the UE does not know the information about the precoding applied to the DMRS, and accordingly the UE may not acquire, from the DMRS, channel information that is not precoded. The UE may acquire the channel information that is not precoded, using an RS separate from the DMRS, namely using the CSI-RS mentioned above.

FIGS. 10A to 10E are diagrams illustrating examples of a CSI-RS pattern. In some scenarios, such implementations may be compatible with an LTE-A system.

FIGS. 10A to 10E show a position of a resource element to which a CSI-RS is transmitted on one resource block pair (in case of a normal CP, 14 OFDM symbols in time domain×12 subcarriers in frequency domain) in which DL data is transmitted. One CSI-RS pattern among patterns depicted in FIG. 10A to FIG. 10E may be used in a prescribed DL subframe. The CSI-RS may be transmitted in response to 8 antenna ports (antenna port index 15, 16, 17, 18, 19, 20, 21 and 22) additionally defined in LTE-A system.

The CSI-RS for antenna ports different from each other may be distinguished from each other in a manner of being positioned at frequency resources (subcarriers) different from each other and/or time resources (OFDM symbols) different from each other (e.g., the CSI-RS for antenna ports different from each other may be multiplexed by FDM and/or TDM scheme). And, the CSI-RS for antenna ports different from each other positioned at an identical time-frequency resource may be distinguished from each other by an orthogonal code (e.g., the CSI-RS for antenna ports different from each other may be multiplexed by CDM scheme). Referring to the example of FIG. 10A, CSI-RSs for an antenna port 15 and 16 may be positioned at resource elements (REs) represented as a CSI-RS CDM group 1 and the CSI-RSs for the antenna port 15 and 16 may be multiplexed by the orthogonal code.

Figure 10A:
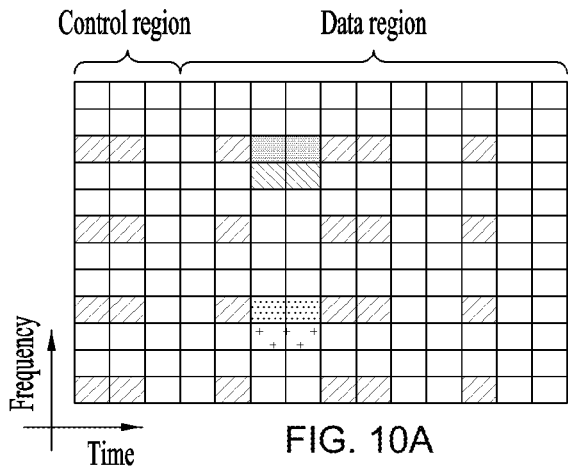
FIGS. 10A to 10E are diagrams illustrating an example of CSI-RS patterns.
Figure 10B:
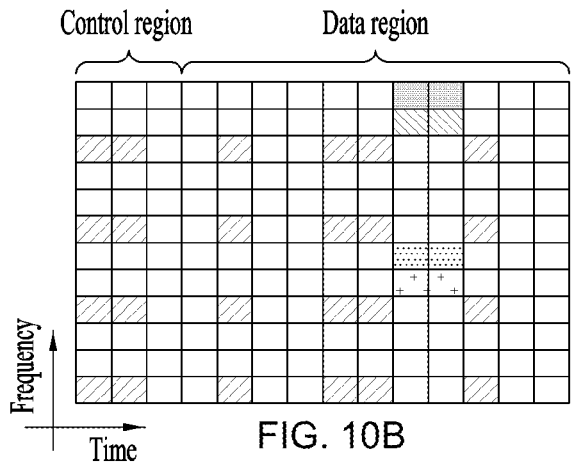
Figure 10C:
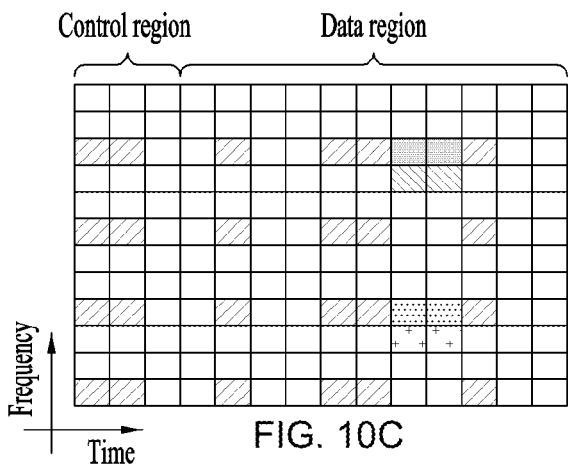
Figure 10D:
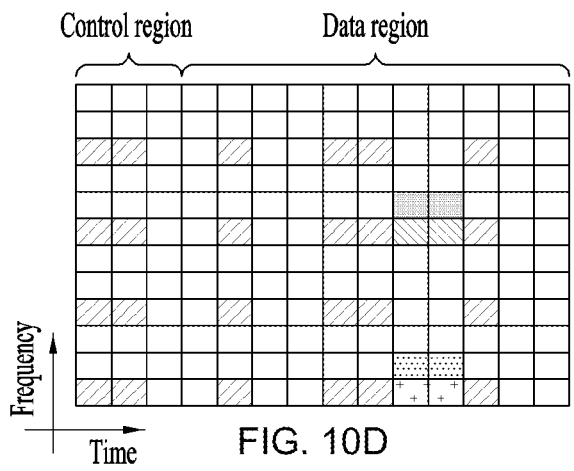
Figure 10E:
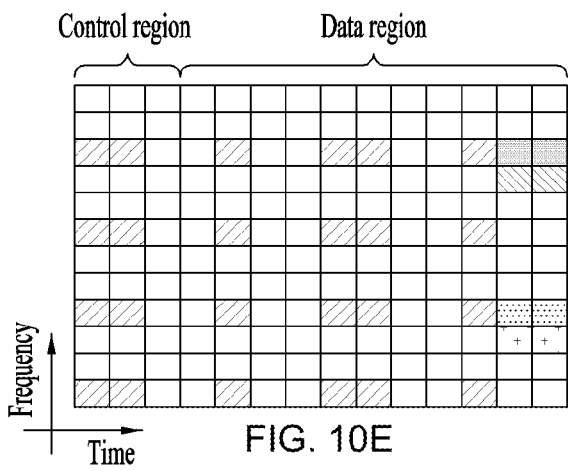

Referring to the example of FIG. 10A, CSI-RSs for an antenna port 17 and 18 may be positioned at resource elements (REs) represented as a CSI-RS CDM group 2 and the CSI-RSs for the antenna port 17 and 18 may be multiplexed by an orthogonal code. Referring to the example of FIG. 10A, CSI-RSs for an antenna port 19 and 20 may be positioned at resource elements (REs) represented as a CSI-RS CDM group 3 and the CSI-RSs for the antenna port 19 and 20 may be multiplexed by the orthogonal code. Referring to the example of FIG. 10A, CSI-RSs for an antenna port 21 and 22 may be positioned at resource elements (REs) represented as a CSI-RS CDM group 4 and the CSI-RSs for the antenna port 21 and 22 may be multiplexed by the orthogonal code. Features of the implementation in FIG. 10A may similarly be applied to FIGS. 10B to 10E.

The RS patterns depicted in FIGS. 8 to 10E are merely examples, and implementations of the present disclosure are limited to a specific RS pattern. In particular, in scenarios where an RS pattern is implemented which is different from the RS patterns depicted in FIGS. 8 to 10E, various features of implementations of the present disclosure may similarly be applied to the different RS patterns.

Hereinafter, examples of transmitting and receiving a reference signal according to implementations the present disclosure will be described in further detail.

In next-generation communication systems, techniques for achieving very low latency and very high reliability in transmitting and receiving information will likely be important. In this regard, techniques for configuring various target Quality of Service (QoS) requirements, such as latency and/or reliability, and performing operation differently according to each target QoS requirement to efficiently provide services that present the target QoS requirements are likely to be important.

According to implementations of the present disclosure, techniques are disclosed that enable sharing a reference signal (RS) in scenarios of repeatedly transmitting downlink data from a base station to a UE in a cellular communication system. Such implementations may provide numerous advantages, such as achieving higher reliability and lower latency.

Various combinations of the details and/or implementations of this disclosure may be implemented. In addition, specific disclosure details are not limited either to the implementations presented in the present disclosure or to a specific system. That is, specific disclosure details may be extended within a scope easily derived from the presented implementations of the present disclosure by those skilled in the art, and may be applied to various communication systems, such as those compatible with LTE, LTE-A, LTE-Pro, NR, and IEEE, to which the implementations of the present disclosure are applicable.

It should also be understood that parameters of the present disclosure, operations of the present disclosure, combinations of the parameters and/or operations, whether or not the corresponding parameters and/or operations are applied, and/or whether a combination of parameters and/or operations is applied may be indicated to the UE by the base station through higher layer signaling and/or physical layer signaling or may be predefined in the system.

In some implementations, details about different subframe types described in the present disclosure may be applicable to different transmission modes (TM). For example, the details may be applied even in scenarios where the TM is changed and differs between two configured subframes of a same subframe type. It is also to be understood that the transmission time interval (TTI) described in the present disclosure may correspond to various time duration units, such as a subslot, a slot, and a subframe.

Here, a subslot and a slot may be referred to as "short TTIs." A short TTI has a shorter time duration than the duration of a TTI for a Downlink Shared Channel (DL-SCH) and an Uplink Shared Channel (UL-SCH), which is 1 ms. A short PDCCH (SPDCCH) and a short PUCCH (SPUCCH) may be implemented as control channels for supporting short TTIs, and may be transmitted for a duration shorter than 1 ms. In some implementations, a slot has a duration of 0.5 ms, and may be composed of 7 symbols. In some implementations, a subslot may be composed of two symbols or three symbols.

Figure 11A:
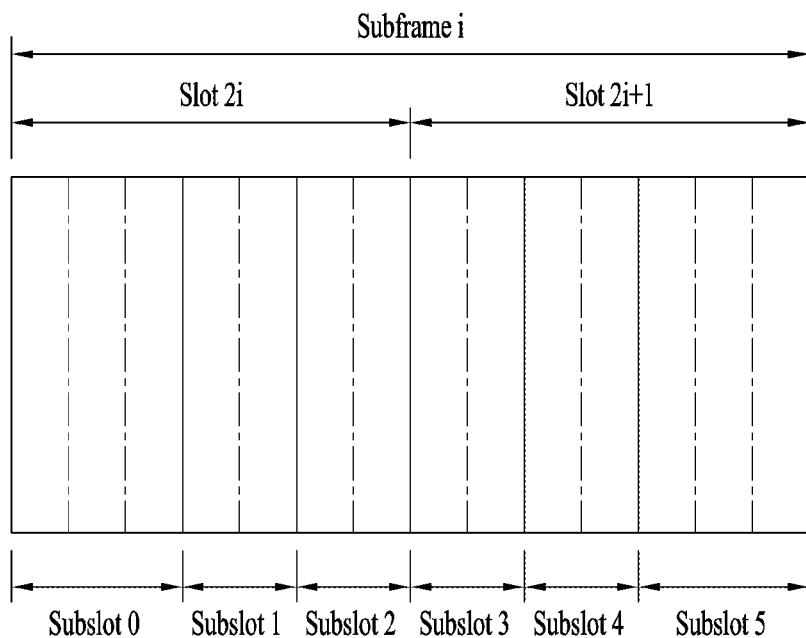
FIGS. 11A and 11B are diagrams illustrating an example of a structure of a short Transmission Time Interval (TTI)
Figure 11B:
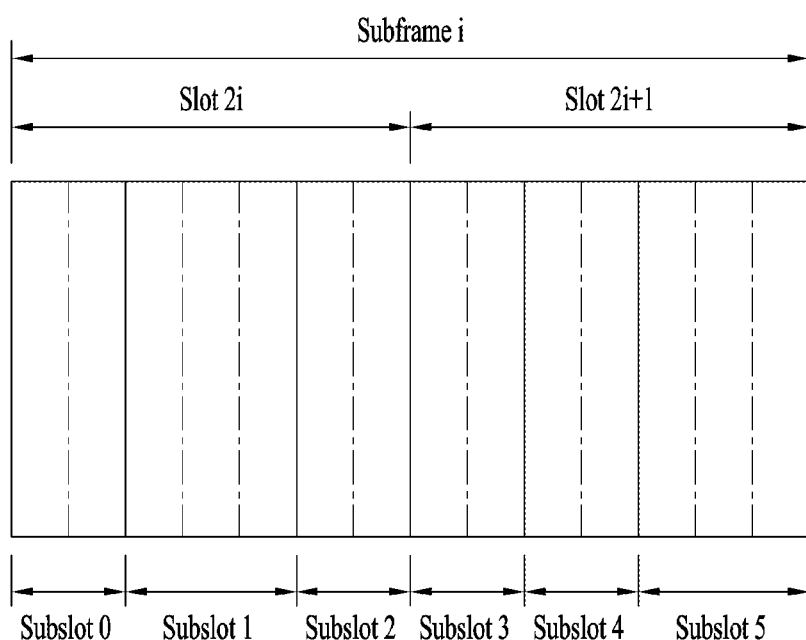

FIGS. 11A and 11B are diagrams illustrating an example of a structure of a short Transmission Time Interval (TTI).

In TDD systems, short TTI-based transmission may be performed on a slot-by-slot basis. In FDD systems, short TTI-based transmission may be performed on a slot-by-slot basis and/or on a subslot-by-subslot basis.

In this scenario, one subframe may be composed of six subslots, and a pattern in which subslots are arranged may vary according to the number of symbols used for a PDCCH. For example, as shown in the example of FIG. 11A, when one symbol or three symbols are used for the PDCCH, each of subslot 0 and subslot 5 may consist of 3 symbols, and each of the other subslots may consist of 2 symbols.

As another example, as shown in FIG. 11B, when two symbols are used for the PDCCH, each of subslot 1 and subslot 5 may consist of three symbols, and each of the other subslots may consist of two symbols.

Figure 12A:
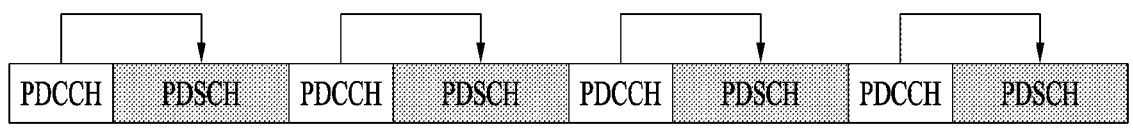
FIGS. 12A and 12B are diagrams illustrating examples of scheduling of a physical downlink shared channel (PDSCH) that is repeatedly transmitted.
Figure 12B:
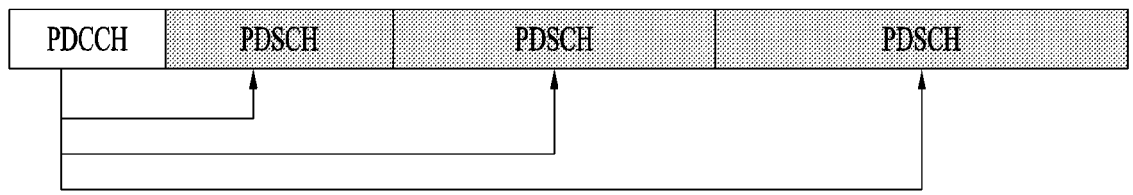

FIGS. 12A and 12B are diagrams illustrating examples of scheduling of a physical downlink shared channel (PDSCH) that is repeatedly transmitted.

Data may be repeatedly transmitted to enhance reliability of downlink transmission. For example, as shown in the example of FIG. 12A, a control channel and a data channel scheduled by the control channel may be independently transmitted in every TTI. In some implementations, for each control channel, a HARQ process number, a New Data Indicator (NDI), and the like, may be used to inform the UE that the data channel transmitted in the plurality of TTIs transmits the same transmission block (TB), and the same data may be repeatedly transmitted during the plurality of TTIs.

As another example, as shown in FIG. 12B, to reduce overhead of control channels compared to FIG. 12A, a control channel transmitted in a single TTI may schedule data to be repeatedly transmitted in a plurality of TTIs. That is, a control channel transmitted in a single TTI may schedule data for a plurality of TTIs.

In scenarios where the control channel is transmitted in a plurality of TTIs, the number of TTIs in which the control channel is transmitted may be less than the number of TTIs in which the data channel is transmitted. In some implementations, information such as a modulation coding scheme (MCS)/resource allocation (RA) in the downlink control information (DCI) for scheduling data that is to be repeatedly transmitted in multiple TTIs may be applied in a same manner to all the TTIs in which the data is repeatedly transmitted. In some implementations, the DCI may include information about the number of times that the data is repeatedly transmitted.

For example, in some short TTI (sTTI) systems, such as those compatible with LTE, a TTI may be configured to have a very short duration. Thus, transmitting a reference signal such as a demodulation reference signal (DMRS) in every short TTI may increase RS overhead, resulting in increase of the code rate of the data. According to implementations of the present disclosure, a reference signal may be shared between TTIs, which may reduce the RS overhead.

In scenarios where DCI, which is transmitted in a specific TTI, schedules data to be repeatedly transmitted in consecutive or non-consecutive TTIs (including the specific TTI), decoding of the DCI may not be attempted in TTIs subsequent to the specific TTI. Alternatively, even if a DCI is detected by attempting to decode the DCI in TTIs subsequent to the specific TTI, the detected DCI may be discarded. In some implementations, the DCI may be C-RNTI-based and related to data scheduling.

In some implementations, the number of repetitions, k, of the data may be set through the DCI. Scenarios where k is set to be greater than 1 may be referred to as "scheduling the data to be repeatedly transmitted." This may refer to data repetition that is configured to be applied based on whether or not HARQ-less/blind data repetition is performed.

However, for a TTI in which decoding of the DCI is not attempted (or for a TTI in which the DCI is detected by attempting decoding, but is discarded), RS sharing-related information about such a TTI may not be able to transmitted in the TTI. Accordingly, implementations disclosed herein enable sharing an RS even in such a TTI.

Prior to further discussion of implementations related to RS-sharing where data is repeatedly transmitted, FIGS. 13 to 15, below, provide examples of operations of a UE, a base station, and a network.

Figure 13:
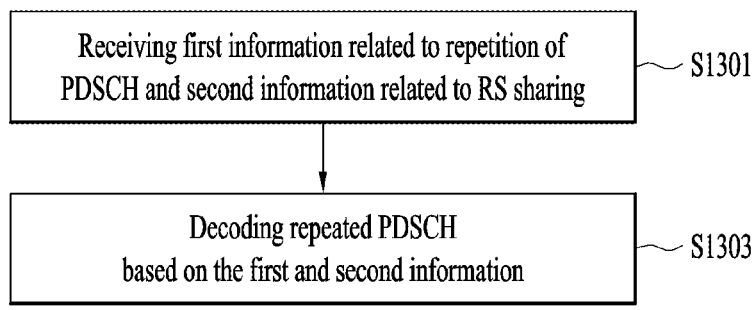
FIGS. 13 to 15 illustrate examples of operations of a UE, a base station and a network according to an implementation of the present disclosure.
Figure 14:
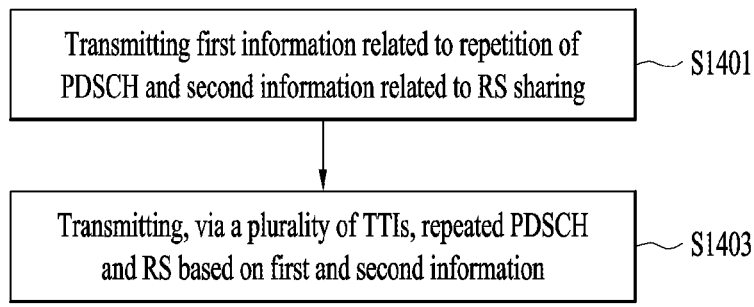
Figure 15:
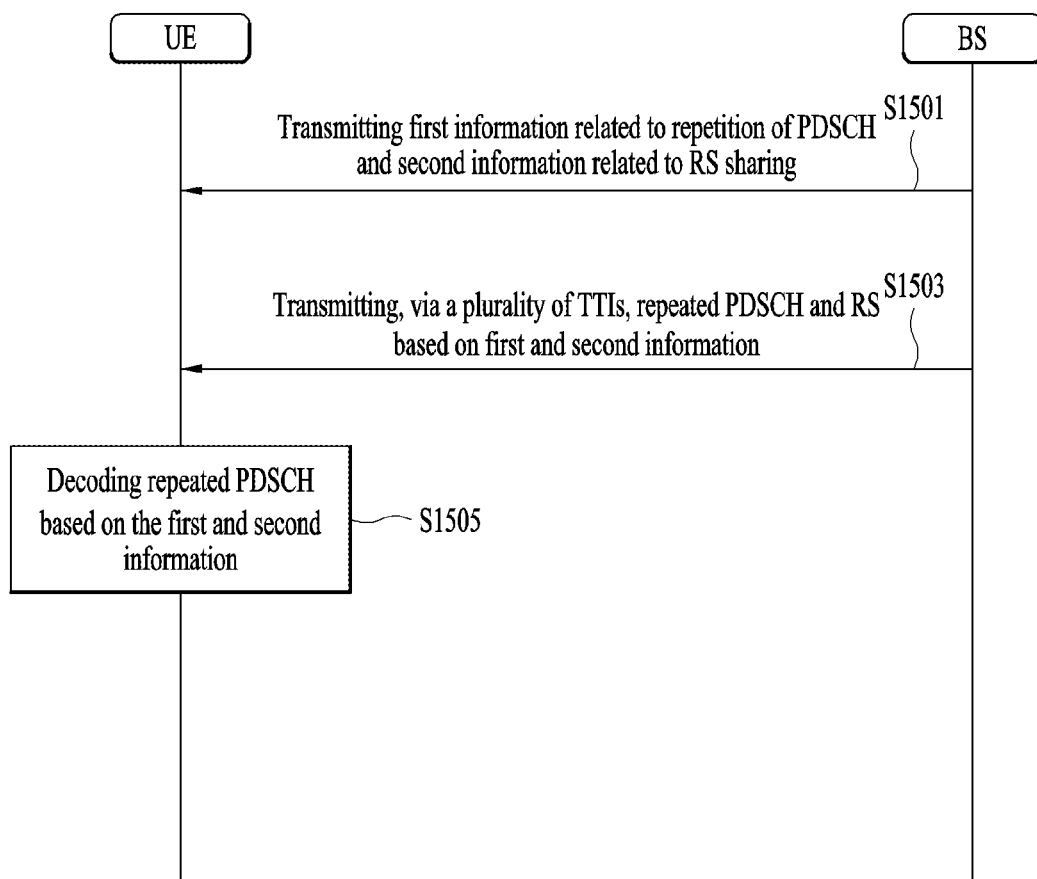

FIGS. 13 to 15 illustrate examples of operations of a UE, a base station, and a network according to implementations of the present disclosure.

FIG. 13 illustrates an example of operations of a UE according to implementations of the present disclosure. A UE receives, from a base station, (i) first information related to repetitive transmission of data and (ii) second information related to RS sharing to be applied in TTIs in which the data is repeatedly transmitted (S1301). Here, the first information and the second information may be received together through the same signaling, or may be individually received through separate signaling. For example, both the first information and the second information may be received through one DCI. Alternatively, the first information may be received through a DCI, and the second information may be received through higher layer signaling. Alternatively, both the first information and the second information may be received through separate DCIs.

Upon receiving the first information and the second information, the UE may decode the repeatedly transmitted data based on the first information and the second information (S1303). Here, use of a shared or unshared RS for decoding of data, as well as information about RS-sharing included in the second information may conform to specific implementations which will be described further below.

FIG. 14 illustrates an example of operations of a base station according to implementations of the present disclosure. The base station transmits (i) first information related to repetitive transmission of data, and (ii) second information related to RS sharing to be applied in TTIs in which the data is repeatedly transmitted (S1401). Here, the first information and the second information may be transmitted together through same signaling, or may be individually transmitted through separate signaling. For example, both the first information and the second information may be transmitted through one DCI. Alternatively, the first information may be transmitted through a DCI, and the second information may be transmitted through higher layer signaling. Alternatively, both the first information and the second information may be transmitted through separate DCIs.

The base station, having transmitted the first information and the second information, may transmit data which is to be repeatedly transmitted through a plurality of TTIs, based on the first information and the second information (S1403). In some implementations, mapping an RS to each of the plurality of TTIs based on the second information (and the information about RS sharing included in the second information) may conform to specific implementations which will be described further below.

FIG. 15 illustrates an example of operations from the perspective of a network, according to implementations of the present disclosure. A base station transmits, to a UE, (i) first information related to repetitive transmission of data, and (ii) second information related to RS sharing applied in TTIs in which the data is repeatedly transmitted (S1501). Here, the first information and the second information may be transmitted together through the same signaling, or may be individually transmitted through separate signaling. For example, both the first information and the second information may be transmitted through one DCI. Alternatively, the first information may be transmitted through a DCI, and the second information may be transmitted through higher layer signaling. Alternatively, both the first information and the second information may be transmitted through separate DCIs. In some implementations, the information about RS sharing included in the second information may conform to implementations which will be described further below.

The base station having transmitted the first information and the second information may transmit data which is to be repeatedly transmitted to the UE through a plurality of TTIs, based on the first information and the second information (S1503). Upon receiving the repeatedly transmitted data, the UE may decode the repeatedly transmitted data based on the first information and the second information (S1505). Here, mapping of an RS to each of the plurality of TTIs based on the second information, and use of a shared RS or a non-shared RS for decoding of the data may conform to implementations which will be described later.

Hereinafter, examples of specific implementations of RS sharing for operation of a UE and a base station illustrated in FIGS. 13 to 15 will be described below.

Figure 16:
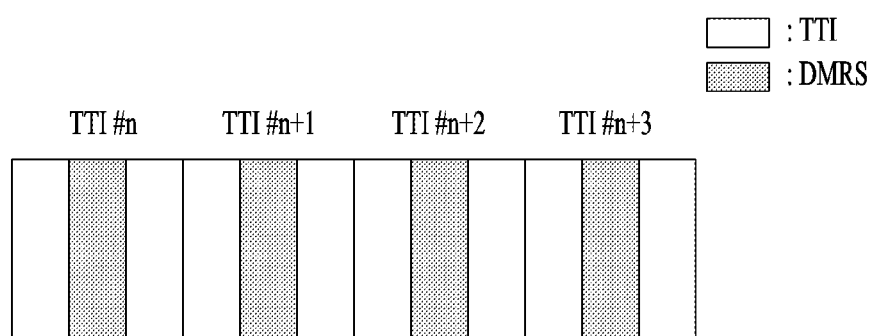
FIGS. 16 to 18 illustrate examples of sharing a demodulation reference signal (DMRS) according to an implementation of the present disclosure.
Figure 17:
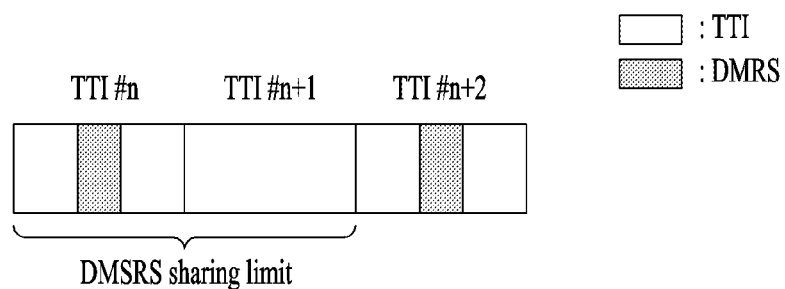
Figure 18:
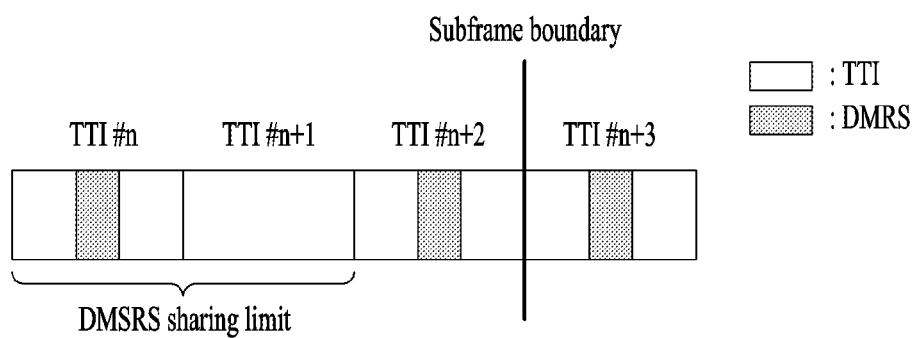

FIGS. 16 to 18 illustrate examples of sharing a demodulation reference signal (DMRS) according to implementations of the present disclosure.

For simplicity, these examples illustrate the scenario of repetitive transmission being performed four times in relation to a specific transmission block (TB), and specifically that the repetitive transmission is performed in TTIs #n, #n+1, #n+2, and #n+3. However, implementations of the present disclosure are not limited to these examples, as the number of repetitive transmissions and/or the TTIs or data positions in which the repetitive transmissions are performed may not be limited to any particular number. In some implementations, for an RS sharing-related operation, the DCI may indicate presence or absence of an RS in a corresponding TTI. In some scenarios, if the DCI indicates that there is no RS in the current TTI, then an RS transmitted in a previous TTI may be shared.

Here, the phrase "sharing an RS" may refer to reusing a channel estimation value (which was measured based on an RS transmitted in a previous TTI or a following TTI) in order to either (i) demodulate the data transmitted within the corresponding TTI, or (ii) obtain information about a channel state for the corresponding TTI. For example, a channel state or the like may be estimated based on an RS that is mapped to the corresponding TTI in order to either (i) demodulate data that is transmitted in the corresponding TTI or (ii) obtain channel state information about the corresponding TTI. Accordingly, in scenarios where variations of the channel state are not expected to be large (e.g., due to relatively short TTIs or due to a good channel environment), then an estimated value that is measured from the RS transmitted in a TTI preceding or following the corresponding TTI may be applied in the corresponding TTI to demodulate data or to obtain information about the channel state. Thereby, resource elements for mapping the RS may be used in mapping the data, which may help improve data throughput.

However, implementations of the present disclosure are not limited to the examples of RS sharing discussed herein, and may be applicable to various types of RS sharing scenarios.

In some scenarios, RS sharing may not be applied, even though the DCI (which is transmitted in a specific TTI) schedules data to be repeatedly transmitted through TTIs including the specific TTI and at least one subsequent consecutive (or non-consecutive) TTI after the specific TTI. An example of such a scenario is shown in FIG. 16. In such scenarios, the RS may be configured to be received in all TTIs in which the data is repeatedly transmitted.

In this example, if the DCI (which is transmitted in a specific TTI) operates or is configured to operate to schedule data that is to be repeatedly transmitted through TTIs including the specific TTI and at least one subsequent consecutive (or non-consecutive) TTI after the specific TTI, then the UE may be configured to not perform RS sharing. Such an operation may be predefined in the system, and the base station may inform the UE, through higher layer signaling and/or physical layer signaling, of whether or not the RS sharing operation is applied.

Alternatively, if repetitive data transmission is configured and the number of times indicated for the repetition of the data is greater than 1, then a specific value (e.g., '1' or another suitable value) may be transmitted in an RS sharing-related DCI field. The transmission of this specific value in this DCI field may indicate that an RS should be transmitted in all TTIs in which repetitive data transmission is performed, and that RS sharing is not applied, as shown in the example of FIG. 16.

In some scenarios, not applying RS-sharing (i.e., transmitting an RS in all TTIs in which data is repeatedly transmitted) may increase reliability of data transmission. For example, if an RS is shared, then channel estimation in a TTI in which the RS is not transmitted may be less accurate, and thus reliability may be lowered. This may conflict with the purpose of repetitive transmission of data, which is to increase reliability by increasing redundancy through repeated transmission of the data. Accordingly, in such scenarios, reliability may be maintained by transmitting the RS in all TTIs in which data is repeatedly transmitted.

In some implementations, when RS sharing is applied to repetitive transmission of data, an RS may be transmitted in the first TTI among the TTIs in which the data is repeatedly transmitted. Then in the second TTI, the RS of the first TTI may be shared, and no RS may be transmitted in the second TTI. In this case, if detection of DCI fails in the first TTI, then the UE may fail to decode not only the data in the first TTI but also data in the second TTI, even if DCI detection is successful in the second TTI. This may be because the UE has failed to obtain information about the RS in the first TTI, and is therefore left without an RS that can be re-used in the second TTI through RS-sharing.

Accordingly, in some implementations, when data is to be repeatedly transmitted, it may be more effective to transmit the RS in all TTIs in which the repetitive data transmission is performed as shown in FIG. 16, rather than applying RS sharing In scenarios where the number of times of repetitive data transmission is indicated as having a value of 1, it may be determined whether or not RS sharing is applied in a TTI in which the corresponding DCI has been transmitted, according to the value of a RS sharing-related DCI field. For example, a technique of applying the RS sharing-related field may be defined differently according to the number of times of repetitive data transmission.

For example, if the number of data repetitions is set to greater than 1, then a specific value (for example, '1' or another suitable value) may be transmitted in the corresponding field such that the RS sharing may not be applied between the TTIs in which data is repeatedly transmitted, and may be used for virtual Cyclic Redundancy Check (CRC). On the other hand, if the number of data repetitions is set to 1, then it may be determined whether or not RS sharing is applied in the corresponding TTI depending on the value transmitted in the corresponding field.

If RS-sharing is not applied to the TTIs in which data is repeatedly transmitted, then the RS sharing-related field in the DCI may be predefined or may be transmitted with a value indicated to the UE by the base station through higher layer signaling and/or physical layer signaling, and may be used for virtual CRC. Alternatively, the field may be configured as an optional field and may be implemented such that the field is present only when RS sharing is configured.

In some scenarios where a first DCI is transmitted in TTI #n−1 to schedule first data (in TTI #n−1) and a second DCI for scheduling repetitive transmission of second data is transmitted in TTI #n such that second data is repeatedly transmitted in TTIs #n, #n+1, #n+2, and #n+3, then it may be indicated that an RS should be shared in TTI #n. Thereby, the operation of sharing, in TTI #n, the RS transmitted in #n−1 may be enabled.

Here, an RS such as DMRS may not be transmitted in TTI #n, for which RS sharing is indicated, and may be transmitted in TTIs #n+1, #n+2, and #n+3. In some implementations, when the UE reports a capability related to repetitive data transmission, a DCI format conforming to the reported content may be implemented. In some implementations, the DCI format may not include the RS sharing-related field.

As another example, RS sharing may be applied even in scenarios where the DCI that is transmitted in a specific TTI operates to schedule data that is to be repeatedly transmitted in TTIs including the specific TTI and at least one subsequent consecutive (or non-consecutive) TTI after the specific TTI.

For example, in the repetitive transmission operation, the base station may indicate an RS sharing operation to the UE through higher layer signaling and/or physical layer signaling. In some implementations, the information indicating the RS sharing operation through higher layer signaling and/or physical layer signaling may include at least one of (i) information about whether RS sharing is to be applied in each TTI or whether there is an RS in a corresponding TTI, or (ii) information regarding a pattern in which the RS sharing is applied between the TTIs in which repetitive transmission is performed. Here, the pattern may be predefined. For example, a pattern in which RS sharing is applied may be predefined according to the number of times of repetitive data transmission, or may be defined based on a maximum possible number of times of repetitive data transmission.

For example, a limit on the number of TTIs in which RS sharing is applied may be configured. This limit may be predefined in the system or may be indicated to the UE by the base station through higher layer signaling and/or physical layer signaling.

In addition, the UE may assume that an RS is transmitted in a specific TTI, such as the first TTI, among the TTIs corresponding to the limited number. In addition, multiple TTIs in which RS sharing is applied may be limited, so as not to be configured across a boundary between subframes or a boundary across which a subframe type is changed. Here, the boundary across which the subframe type is changed may refer to, for example, a boundary across which the subframe type is changed from a Multicast Broadcast Single Frequency Network (MBSFN) subframe to a non-MBSFN subframe, or may refer to a boundary across which the subframe type is changed from a non-MBSFN subframe to an MBSFN subframe.

In some implementations, multiple TTIs in which RS sharing is applied may be configured across a boundary between subframes or a boundary across which a subframe type is changed. Whether the multiple TTIs in which RS sharing is applied can be configured across the boundary between subframes or the boundary across which the subframe type is changed may be predefined in the system or may be indicated to the UE by the base station through higher layer signaling and/or physical layer signaling.

If the number of times of configured repetitive transmission of data is greater than the number limit of TTIs in which the RS sharing is applied, then in some implementations, the TTIs may be divided into groups in a unit of the number limit for application of RS sharing within the configured number of times of repetitive transmission of the data. In such implementations, in each divided group, an RS may be transmitted in a specific TTI among a plurality of TTIs corresponding to the number limit. In this case, the RS may be configured to be transmitted in the TTIs remaining after the number of times of repetitive transmission of the configured data is configured in the unit of the number limit for RS sharing.

For example, referring to FIG. 17, if the number of times of repetitive data transmission is set to 3 and the TTI number limit for RS sharing is 2, then a DMRS may be transmitted only in one of the first two TTIs configured in the unit of the TTI number limit for RS sharing among the three data transmission TTIs. As such, in this example, a DMRS is shared between the first two TTIs, and a DMRS is transmitted in the remaining one TTI which is fewer than the number limit for application of RS sharing.

In scenarios where the number of times of repetitive transmission of the data is configured to be less than the number limit for RS sharing, the RS may be transmitted only in some TTIs (e.g., the first TTI) of the TTIs corresponding to the number of times of repetitive transmission of the data. Alternatively, the RS may be transmitted in all the TTIs corresponding to the number of times of repetitive transmission of the data.

For example, if the number of times of repetitive transmission of the data is 2 and the number limit for RS sharing is 3, then the RS may be transmitted only in the first one of the two TTIs in which data is repeatedly transmitted and may not be transmitted in the second TTI. Alternatively, the RS may be transmitted in both the first TTI and the second TTI.

In some implementations, whether such operation is to be performed may be predefined in the system, or may be indicated to the UE by the base station through higher layer signaling and/or physical layer signaling.

In some implementations, if the configured number of times of repetitive data transmission is not perfectly divisible by the number limit for application of RS sharing, then an RS (e.g., DMRS) may be transmitted in every TTI. In such scenarios, RS sharing may not be applied.

In a case where repetitive transmission of data is configured across a subframe boundary when RS sharing is limited to be performed within the subframe boundary, TTIs in which the data is repeatedly transmitted may be divided based on the subframe boundary, and the operations for RS sharing may be applied within the TTIs for repetitive data transmission included in each subframe.

As an example, FIG. 18 illustrates a scenario in which the number of TTIs in which RS sharing is applied is limited to 2 and the number of times of repetitive transmission of data is configured as 4, TTIs in which repetitive transmission is performed may be divided into three TTIs and one TTI. In this case, the RS sharing operation described above may be applied within the three TTIs/one TTI included in each of the two subframes. Thus, the three TTIs included in the preceding subframe may be divided into two TTIs and one TTI based on the TTI number limit for RS sharing such that one RS is transmitted in each of TTI #n and TTI #n+2, and an RS may be transmitted in one TTI included in the following subframe. Accordingly, in the example of FIG. 18, the RS may be transmitted in the first, third, and fourth TTIs (i.e., TTI #n, TTI #n+2, and TTI #n+3), among the TTIs for four repetitive data transmissions.

More generally, in scenarios where repetitive transmission of data is configured over different subframes, RS sharing may be applied only among TTIs that are positioned within the same subframe, or only among TTIs that are positioned within subframes of the same subframe type. Here, the same subframe type may refer to a case where multiple subframes are all MBSFN subframes or non-MBSFN subframes.

Here, if repetitive transmission of data is configured over different subframes or subframe types, then RS sharing may be applied in only one of the preceding subframe and the following subframe, and the RS may be transmitted in every TTI in the other subframe.

For example, if the subframe type is changed from a subframe (or an MBSFN subframe) configured in a DMRS-based transmission mode to a subframe (or a non-MBSFN subframe) configured in a CRS-based transmission mode, then DMRS sharing may be applied only in the MBSFN subframe or the TTIs in which the DMRS-based transmission mode is configured, and may not be applied in the non-MBSFN subframe or the TTIs in which the CRS-based transmission mode is configured.

Alternatively, as described above, if RS sharing is performed together with repetitive data transmission, then all TTIs in which data is repeatedly transmitted may be arranged in the same subframe. In some implementations, RS sharing may be applied only when the subframes before and after the subframe boundary are configured in the same transmission mode. Alternatively, if the transmission mode is changed across the subframe boundary, then the RS transmitted in the transmission mode configured in the preceding subframe may be configured to be transmitted in the following subframe. For example, if the transmission mode is changed from a subframe configured in the DMRS-based transmission mode to a subframe configured in the CRS-based transmission mode, then the DMRS may also be transmitted in the subframe configured in the CRS-based transmission mode.

There may be a case where the first TTI (e.g., sTTI) in a subframe may not be available for data transmission, depending on the value of the Control Format Indicator (CFI) indicated by higher layer signaling (e.g., Physical Control Format Indicator Channel (PCFICH) signaling), and/or physical layer signaling (e.g., Radio Resource Control (RRC) signaling). That is, there is a case where a specific TTI is included in symbols configured as a control region and thus is not available for data transmission, depending on the CFI value.

In this case, when a UE counts the number of times of repetitive transmission, the UE may perform the counting operation by excluding the specific TTI. For example, if TTI #n+1 is included in the symbols that are configured as a control region (and is therefore not available for data transmission when the UE detects, in TTI #n, DCI indicating 4 as the number of times of repetitive transmission), then the UE may assume that repetitive transmission of the data is performed in TTIs #n, #n+2, #n+3, and #n+4.

In this case, the RS sharing operation may be performed in the TTI that is not available for data transmission, in the same manner as in the part related to the subframe boundary in the above-described implementations. For example, if TTI #n+1 is not available for data transmission, then the TTIs in which the data is repeatedly transmitted may be divided based on TTI #n+1, and the above-described implementations related to application of RS sharing may be applied in the divided TTIs for repetitive data transmission.

For example, if TTI #n+1 is not available for data transmission (as in the previous example) in a situation where the number of TTIs in which RS sharing is applied is limited to 2 and the number of times of repetitive transmission of data is configured to be 4, then TTIs in which the data is repeatedly transmitted may be divided into one TTI and three TTIs based on TTI #n+1. In this case, the basic operation described above may be applied within one TTI/three TTIs. Thus, the RS may be transmitted in the preceding one TTI, while the next three TTIs may be divided into two TTIs and one TTI based on the TTI number limit for RS sharing such that one RS is transmitted in each group. That is, the RS may be transmitted in the first TTI (TTI #n), the second TTI (TTI #n+2), and the fourth TTI (TTI #n+4) among the four repetitive transmission TTIs.

In some implementations, in the case where the first TTI (e.g., sTTI) in a subframe is not available for data transmission according to the value of CFI indicated by higher layer signaling, such as PCFICH signaling, and/or physical layer signaling, such as RRC signaling, then the UE may count the number of times of repetitive transmission including the first TTI. For example, if TTI #n+1 is included in the symbols configured as a control region (and is therefore not available for data transmission when the UE detects, in TTI #n, DCI indicating 4 as the number of times of repetitive transmission), then the UE may assume that the repetitive transmission of the data is performed only in TTIs #n, #n+2, and #n+3.

In this case, RS sharing may be applied based on TTIs #n, #n+2, and #n+3. For example, the TTIs in which data is repeatedly transmitted may be divided into one TTI and two TTIs based on TTI #n+1. Then, an RS may be transmitted in the preceding one TTI (TTI #n), and may also be transmitted in TTI #n+2 between the following two TTIs (TTI #n+2 and TTI #n+3).

In addition, if a DCI transmitted in a specific TTI operates or is configured to operate to schedule data that is to be repeatedly transmitted in TTIs including the specific TTI and at least one subsequent consecutive (or non-consecutive) TTI after the specific TTI, then whether to apply RS sharing or an RS sharing pattern in the subsequent TTIs including the specific TTI may be determined according to the value of an RS sharing-related field included in the DCI. This may be interpreted as meaning that an RS sharing pattern to be applied to the TTIs in which data is repeatedly transmitted is determined according to the value of the RS sharing-related field included in the DCI, or may be interpreted as meaning that whether to share an RS in the TTI in which the DCI is transmitted is determined according to the value of the RS sharing-related field in the TTI, and that whether to apply RS sharing or an RS sharing pattern in subsequent TTIs is determined according to the value of the field.

In some implementations, regarding whether to apply RS sharing or the RS sharing pattern, the number corresponding to the size of the field and/or the number of times of repetitive data transmission may be predefined in the system, or may be indicated to the UE by the base station through higher layer signaling and/physical layer signaling. For example, if the size of the RS sharing-related field is 1 bit, then two RS patterns for each repetitive transmission of data may be predefined in the system, or may be indicated to the UE by the base station through higher layer signaling and/or physical layer signaling, and a pattern corresponding to a result of decoding of the field may be determined as an RS sharing pattern for repetitive transmission of the data.

For example, if the value of '0' has been transmitted in the field as a result of the decoding, then RS sharing may not be applied during the entire repetitive data transmission scheduled by the DCI, and the RS may be transmitted in all TTIs in which the data is repeatedly transmitted. On the other hand, if the value of '1' is transmitted in the field, then an RS sharing pattern predefined in the system or indicated to the UE by the base station over higher layer signaling and/or physical layer signaling may be applied to the TTIs in which the data is repeatedly transmitted.

In some implementations, the base station may transmit multiple DCIs indicating repetitive transmission of the same data in multiple TTIs. Such implementations may, in some scenarios, improve reliability of the control channel. In this case, the DCIs may indicate different patterns according to the positions of the TTIs in which the DCIs are transmitted, even if the DCIs schedule repetitive transmission of the same data. In other words, even if the absolute positions of the RS transmitted during the repetitive transmission of the data are fixed, the DCIs may indicate different transmission patterns of the RS (i.e., RS sharing patterns) according to the positions of the TTIs in which the DCIs are transmitted. In this case, it may be indicated that the RS sharing should not be applied according to the value indicated by the corresponding field in the DCI, or different RS sharing patterns may be indicated according to the DCI transmission positions.

Operation may be performed according to the value of the RS-sharing-related field in the DCI in the first TTI in which the DCI for scheduling data to be repeatedly transmitted over a plurality of TTIs is transmitted. Whether to apply RS sharing or an RS sharing pattern applied for the data repeatedly transmitted in subsequent TTIs may be determined according to the value of the field. For example, if the value of the field is '0', then no RS may be transmitted in the corresponding TTI and the RS transmitted in the previous TTI may be shared in the TTI. As another example, if the value of the field is '1', then RS sharing may not be applied, and an RS may be transmitted in the corresponding TTI. Alternatively, an RS sharing pattern or whether to apply RS sharing for the data to be repeatedly transmitted in subsequent TTIs may be predefined in the system, or may be indicated to the UE by the base station through higher layer signaling and/or physical layer signaling.

If the value of the RS sharing-related field in the DCI transmitted in the first TTI for the repeatedly transmitted data is '1', then an RS may be transmitted in the first TTI. Subsequently, if data to be repeatedly transmitted is present in the second TTI, then no RS may be transmitted in the second TTI and instead the RS of the first TTI may be shared in the second TTI. In the third TTI having the data to be subsequently repeatedly transmitted, an RS may be transmitted. Thereafter, in the fourth TTI having the data to be subsequently repeatedly transmitted, no RS may be transmitted in the fourth TTI, and instead the RS of the third TTI may be shared in fourth TTI. As such, RS sharing may be performed in various ways. That is, the RS may be configured to be transmitted in every two TTIs among the TTIs in which data is repeatedly transmitted, and RS sharing may be performed according to the configuration.

In the above-described example, the intervals at which the RS is transmitted may be predefined in the system, or may be configured differently according to an RS sharing unit indicated to the UE by the base station through higher layer signaling and/or physical layer signaling.

In some scenarios, RS sharing may have an influence on the performance of channel estimation. The influence on the channel estimation may vary depending on the channel environment of the UE, such as an SNR/SINR. Accordingly, in some implementations, the base station may indicate to the UE, based on a target QoS requirement and/or a condition of the UE (e.g., SNR/SINR), whether to apply RS sharing (e.g., through higher layer signaling and/or physical layer signaling). If RS sharing is configured not to be applied, then a first value (e.g., '1') may be transmitted in the RS sharing-related DCI field such that the RS is transmitted in all TTIs in which the data is repeatedly transmitted. If RS sharing is configured to be applied, then a second value (e.g., '0') may be transmitted in the field to indicate an RS sharing pattern in which the RS is transmitted.

Alternatively, whether to apply RS sharing may be implicitly determined according to the value transmitted in the field of the DCI without separate configuration regarding whether to apply RS sharing. Here, the RS sharing pattern may be predefined in the system, or may be indicated to the UE by the base station through higher layer signaling and/or physical layer signaling.

In some implementations, the base station may transmit, in multiple TTIs, multiple DCIs that indicate repetitive transmission of the same data. Such implementations may improve reliability of the control channel. In this case, the DCIs may indicate different RS sharing patterns according to the positions of the TTIs in which the DCIs are transmitted (even if the DCIs schedule repetitive transmission of the same data). Accordingly, if an RS sharing pattern is predefined in the system, then the RS sharing pattern may be determined regardless of the transmission positions of the DCIs. That is, the RS sharing pattern may be determined so as not to have a dependency on the scheduling of the UE.

In this case, whether to transmit an RS may be determined according to the index of the TTI. For example, in a LTE sTTI system, six TTIs may be configured as sTTIs #0, #1, #2, #3, #4, and #5 in an LTE subframe. Here, sTTI #0 may not be available for data transmission depending on the configuration of CFI. Accordingly, when sTTIs #1, #3, and #5 correspond to repetitive data transmission, the RS may be transmitted in the TTIs. When the repetitive data transmission corresponds to sTTIs #0, #2, and #4, the RSs of sTTIs #1, #3, and #5 may be shared.

Here, a TTI in which no RS is transmitted but an RS is shared may be a TTI preceding or following a TTI in which the RS is transmitted (which may be predefined). For example, if repetitive transmission of data is performed over sTTIs #0, #1, #2 and #3, then the RS may be transmitted only in sTTIs #1 and #3, and the data transmitted in sTTIs #0 and #2 may share the RSs transmitted in sTTI #1 and #3, respectively. As another example, if repetitive transmission of data is performed over sTTI #1, #2, #3 and #4, then RSs may be transmitted only in sTTI #1 and #3, and the data transmitted in sTTI #2 and #4 may share the RSs transmitted in sTTI #1 and #3, respectively. Here, whether the RS is shared may be predefined in the system or may be indicated to the UE by the base station (e.g., through higher layer signaling and/or physical layer signaling). For example, if '1' is transmitted in the RS sharing-related field through the DCI, then the RS may be transmitted in all TTIs without application of RS sharing. If '0' is transmitted in the field, then an RS may be shared according to the implementation described above.

In some implementations, if RS sharing is configured but is disabled through the DCI, then the UE may assume that the DMRS is transmitted in every TTI in which repetitive transmission is performed, and that the same time-domain precoding is applied while the data is repeatedly transmitted. For example, if repetitive transmission of data is enabled, then time-domain precoding may be enabled if the value of the RS sharing-related field is '1', and RS sharing (i.e., DMRS sharing) may be enabled if the value of the RS sharing-related field is '0'. In some implementations, enabling/disabling the time-domain precoding separately from RS sharing (i.e., DMRS sharing) may also be implemented.

Figure 19:
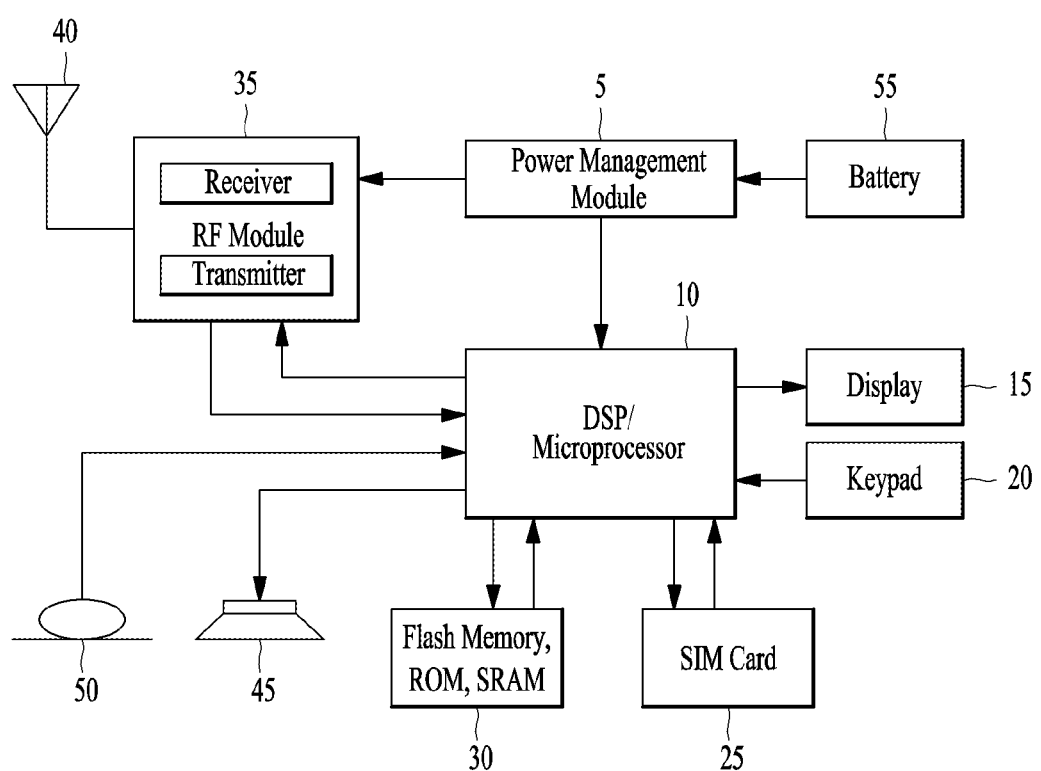
FIG. 19 is a block diagram of an example of wireless devices that may be used for implementing the present disclosure.

FIG. 19 shows an example of a radio communication apparatus according to implementations of the present disclosure.

The wireless communication apparatus illustrated in FIG. 19 may represent a UE (User Equipment) and/or a base station according to implementations of the present disclosure. However, the wireless communication apparatus of FIG. 19 is not necessarily limited to the UE and/or the base station according to the present disclosure, and may implement various types of apparatuses, such as a vehicle communication system or apparatus, a wearable apparatus, a laptop, etc.

In the example of FIG. 19, a UE and/or a base station according to an implementation of the present disclosure includes at least one processor 10 such as a digital signal processor or a microprocessor, a transceiver 35, a power management module 5, an antenna 40, a battery 55, a display 15, a keypad 20, at least one memory 30, a subscriber identity module (SIM) card 25, a speaker 45, and a microphone 50, and the like. In addition, the UE and/or the base station may include a single antenna or multiple antennas. The transceiver 35 may be also referred to as an RF module.

The at least one processor 10 may be configured to implement the functions, procedures and/or methods described throughout this disclosure, e.g., as described in FIGS. 1 to 18. In at least some of the implementations described in FIGS. 1 to 18, the at least one processor may implement one or more protocols, such as layers of the air interface protocol (e.g., functional layers).

The at least one memory 30 is connected to the at least one processor 10 and stores information related to the operation of the at least one processor 10. The at least one memory 30 may be internal or external to the at least one processor 10 and may be coupled to the at least one processor 10 via a variety of techniques, such as wired or wireless communication.

The user can input various types of information (for example, instruction information such as a telephone number) by various techniques such as pressing a button on the keypad 20 or activating a voice using the microphone 50. The at least one processor 10 performs appropriate functions such as receiving and/or processing information of the user and dialing a telephone number.

It is also possible to retrieve data (e.g., operational data) from the SIM card 25 or the at least one memory 30 to perform the appropriate functions. In addition, the at least one processor 10 may receive and process GPS information from the GPS chip to obtain location information of the UE and/or base station such as vehicle navigation, map service, or the like, or perform functions related to location information. In addition, the at least one processor 10 may display these various types of information and data on the display 15 for reference and convenience of the user.

The transceiver 35 is coupled to the at least one processor 10 to transmit and/or receive radio signals, such as RF signals. At this time, the at least one processor 10 may control the transceiver 35 to initiate communications and transmit wireless signals including various types of information or data, such as voice communication data. The transceiver 35 may comprise a receiver for receiving the radio signal and a transmitter for transmitting. The antenna facilitates the transmission and reception of radio signals. In some implementations, upon receipt of a radio signal, the transceiver 35 may forward and convert the signal to a baseband frequency for processing by the at least one processor 10. The processed signals may be processed according to various techniques, such as being converted into audible or readable information, and such signals may be output via the speaker 45.

In some implementations, a sensor may also be coupled to the at least one processor 10. The sensor may include one or more sensing devices configured to detect various types of information, including velocity, acceleration, light, vibration, and the like. The at least one processor 10 receives and processes the sensor information obtained from the sensor such as proximity, position, image, and the like, thereby performing various functions such as collision avoidance and autonomous travel.

Meanwhile, various components such as a camera, a USB port, and the like may be further included in the UE and/or the base station. For example, a camera may be further connected to the at least one processor 10, which may be used for a variety of services such as autonomous navigation, vehicle safety services, and the like.

FIG. 19 merely illustrates one example of apparatuses constituting the UE and/or the base station, and the present disclosure is not limited thereto. For example, some components, such as keypad 20, Global Positioning System (GPS) chip, sensor, speaker 45 and/or microphone 50 may be excluded for UE and/or base station implementations in some implementations.

Specifically, operation performed to implement implementations of the present disclosure in the case where the wireless communication apparatus presented in FIG. 19 is configured as a UE according to an implementation of the present disclosure will be described. When the wireless communication apparatus is a UE according to an implementation of the present disclosure, the processor 10 controls the transceiver 35 to receive, from the base station, first information related to repetitive transmission of data and second information related to RS sharing applied in the TTIs in which the data is repeatedly transmitted. Here, the first information and the second information may be received together through the same signaling, or may be individually received through separate signaling. For example, both the first information and the second information may be received through one DCI. Alternatively, the first information may be received through a DCI, and the second information may be received through higher layer signaling. Alternatively, both the first information and the second information may be received through DCI. In this case, the first information and the second information may be received through separate DCIs.

Upon receiving the first information and the second information, the processor 10 may decode the repeatedly transmitted data based on the first information and the second information. Here, use of a shared or unshared RS for decoding of the data and information about RS sharing included in the second information may conform to specific implementations described hereinabove.

In scenarios where the wireless communication apparatus presented in FIG. 19 is configured as a base station according to implementations of the present disclosure, the at least one processor 10 may control the transceiver 35 to transmit first information related to repetitive transmission of data and second information related to RS sharing applied in the TTIs in which the data is repeatedly transmitted. Here, the first information and the second information may be transmitted together through the same signaling, or may be individually transmitted through separate signaling. For example, both the first information and the second information may be transmitted through one DCI. Alternatively, the first information may be transmitted through a DCI, and the second information may be transmitted through higher layer signaling. Alternatively, both the first information and the second information may be transmitted through DCI. In this case, the first information and the second information may be transmitted through separate DCIs.

Upon transmitting the first information and the second information, the at least one processor 10 may control the transceiver 35 to transmit data subjected to repetitive transmission through a plurality of TTIs based on the first information and the second information. Here, the method for mapping the RS to each of the plurality of TTIs based on the second information and the information about RS sharing included in the second information may conform to specific implementations described hereinabove.

The implementations described above are those in which the elements and features of the present disclosure are combined in a predetermined form. Each component or feature shall be considered optional unless otherwise expressly stated. Each component or feature may be implemented in a form that is not combined with other components or features. It is also possible to construct implementations of the present disclosure by combining some of the elements and/or features. The order of the operations described in the implementations of the present disclosure may be changed. Some configurations or features of certain implementations may be included in other implementations, or may be replaced with corresponding configurations or features of other implementations. It is clear that the claims that are not expressly cited in the claims may be combined to form an implementation or be included in a new claim by an amendment after the application.

The specific operation described herein as being performed by the base station may be performed by its upper node, in some cases. That is, it is apparent that various operations performed for communication with a UE in a network including a plurality of network nodes including a base station can be performed by the base station or by a network node other than the base station. A base station may be replaced by terms such as a fixed station, a Node B, an eNode B (eNB), an access point, and the like.

Implementations according to the present disclosure may be implemented by various techniques, for example, hardware, firmware, software or a combination thereof. In the case of hardware implementation, an implementation of the present disclosure may include one or more application specific integrated circuits (ASICs), digital signal processors (DSPs), digital signal processing devices (DSPDs), programmable logic devices (PLDs) field programmable gate arrays, processors, controllers, microcontrollers, microprocessors, and the like.

In the case of an implementation by firmware or software, an implementation of the present disclosure may be implemented in the form of a module, a procedure, a function, or the like for performing the functions or operations described above. The software code can be stored in a memory unit and driven by the processor. The memory unit may be located inside or outside the processor, and may exchange data with the processor by various techniques.

Although a method and apparatus for transmitting and receiving a reference signal have been described focusing on examples in which the method and apparatus are applied to the 3GPP LTE system, the method and apparatus are applicable to various wireless communication systems other than the 3GPP LTE system.

As is apparent from the above description, the present disclosure has an effect as follows.

According to implementations of the present disclosure, a reference signal may be shared such that data may be repeatedly transmitted with high reliability and low latency in accordance with characteristics of repeatedly transmitted data.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

What is claimed is:

1. A method of receiving, by a user equipment (UE), a reference signal in a wireless communication system, the method comprising:
   receiving downlink control information (DCI) for scheduling downlink data in a first transmission time interval (TTI);
   acquiring, from the DCI, information related to whether the reference signal is included in the first TTI in which the downlink data is scheduled;
   receiving, in the first TTI, the reference signal for the first TTI based on the information related to whether the reference signal is included in the first TTI; and
   based on the downlink data scheduled to be repeatedly transmitted in the first TTI and at least one second TTI:
      receiving, in each of the at least one second TTI, a reference signal for the each of the at least one second TTI.

2. The method of claim 1, wherein the information related to whether the reference signal is included in the first TTI comprises a fixed value.

3. The method of claim 2, wherein the fixed value in the information related to whether the reference signal is included in the first TTI is used to inform that the reference signal for the first TTI is included in the first TTI.

4. The method of claim 1, further comprising:
   acquiring, from the DCI, information regarding a number of times that the downlink data is scheduled to be repeatedly transmitted in the first TTI and the at least one second TTI.

5. The method of claim 4, wherein based on the downlink data scheduled to be repeatedly transmitted in the first TTI and in the at least one second TTI:
   the number of times that the downlink data is scheduled to be repeatedly transmitted is greater than 1.

6. The method of claim 1, wherein the first TTI and the at least one second TTI are short TTIs.

7. The method of claim 1, wherein the at least one second TTI comprises a plurality of second TTIs that are consecutively arranged in time with the first TTI.

8. An apparatus configured to receive a reference signal in a wireless communication system, the apparatus comprising:
   at least one processor; and
   at least one computer memory operably connectable to the at least one processor and storing instructions that, when executed by the at least one processor, perform operations comprising:
      receiving downlink control information (DCI) for scheduling downlink data in a first transmission time interval (TTI);
      acquiring, from the DCI, information related to whether the reference signal is included in the first TTI in which the downlink data is scheduled;
      receiving, in the first TTI, the reference signal for the first TTI, based on the information related to whether the reference signal is included in the first TTI; and
      based on the downlink data scheduled to be repeatedly transmitted in the first TTI and at least one second TTI:
         receiving, in each of the at least one second TTI, a reference signal for the each of the at least one second TTI.

9. The apparatus of claim 8, wherein the information related to whether the reference signal is included in the first TTI comprises a fixed value.

10. The apparatus of claim 9, wherein the fixed value in the information related to whether the reference signal is included in the first TTI is used to inform that the reference signal for the first TTI is included in the first TTI.

11. The apparatus of claim 8, further comprising:
acquiring, from the DCI, information regarding a number of times that the downlink data is scheduled to be repeatedly transmitted in the first TTI and the at least one second TTI.

12. The apparatus of claim 11, wherein the number of times that the downlink data is scheduled to be repeatedly transmitted in the first TTI and the at least one second TTI is greater than 1.

13. The apparatus of claim 8, wherein the first TTI and the at least one second TTI are short TTIs.

14. The apparatus of claim 8, wherein the at least one second TTI comprises a plurality of second TTIs that are consecutively arranged in time with the first TTI.

15. The apparatus of claim 8, wherein the apparatus comprises a user equipment (UE) configured to receive the reference signal in the wireless communication system, the UE comprising at least one transceiver, the at least one processor, and the at least one computer memory.

16. A method of transmitting, by a base station, a reference signal in a wireless communication system, the method comprising:
transmitting downlink control information (DCI) for scheduling downlink data in a first transmission time interval (TTI), the DCI comprising information related to whether the reference signal is included in the first TTI in which the downlink data is scheduled;
transmitting, in the first TTI, the reference signal for the first TTI based on the information related to whether the reference signal is included in the first TTI; and
based on the downlink data scheduled to be repeatedly transmitted in the first TTI and at least one second TTI:
transmitting, in each of the at least one second TTI, a reference signal for the each of the at least one second TTI.

17. A base station (BS) configured to transmit a reference signal in a wireless communication system, the BS comprising:
at least one transceiver;
at least one processor; and
at least one computer memory operably connectable to the at least one processor and storing instructions that, when executed by the at least one processor, perform operations comprising:
transmitting, through the at least one transceiver, downlink control information (DCI) for scheduling downlink data in a first transmission time interval (TTI), the DCI comprising information related to whether the reference signal is included in the first TTI in which the downlink data is scheduled;
transmitting, in the first TTI through the at least one transceiver, the reference signal for the first TTI based on the information related to whether the reference signal is included in the first TTI; and
based on the downlink data scheduled to be repeatedly transmitted in the first TTI and at least one second TTI:
transmitting, in each of the at least one second TTI through the at least one transceiver, a reference signal for the each of the at least one second TTI.

* * * * *